US012674072B2

(12) United States Patent
Li et al.

(10) Patent No.: US 12,674,072 B2
(45) Date of Patent: Jul. 7, 2026

(54) COATING COMPOSITIONS

(71) Applicant: GKN AEROSPACE SERVICES LIMITED, Solihull (GB)

(72) Inventors: Jieming Li, Garden Grove, CA (US); Marlowe Moncur, Garden Grove, CA (US); Lin H. Hoo, Garden Grove, CA (US)

(73) Assignee: GKN Aerospace Services Limited (GB)

(*) Notice: Subject to any disclaimer, the term of this patent is extended or adjusted under 35 U.S.C. 154(b) by 1034 days.

(21) Appl. No.: 17/791,693

(22) PCT Filed: Jan. 13, 2021

(86) PCT No.: PCT/US2021/013209

§ 371 (c)(1),
(2) Date: Jul. 8, 2022

(87) PCT Pub. No.: WO2021/146264

PCT Pub. Date: Jul. 22, 2021

(65) Prior Publication Data

US 2023/0066264 A1 Mar. 2, 2023

(30) Foreign Application Priority Data

Jan. 14, 2020 (GB) ..................................... 2000544

(51) Int. Cl.

| | |
|---|---|
| ***C09D 175/06*** | (2006.01) |
| ***C08G 18/10*** | (2006.01) |
| ***C08G 77/458*** | (2006.01) |
| ***C08L 75/06*** | (2006.01) |
| ***C09D 4/00*** | (2006.01) |
| ***C09D 5/32*** | (2006.01) |
| ***C09D 7/20*** | (2018.01) |
| ***C09D 7/63*** | (2018.01) |
| ***C09D 175/04*** | (2006.01) |
| ***C09D 183/04*** | (2006.01) |
| ***C09D 183/06*** | (2006.01) |

(52) U.S. Cl.

CPC ........... *C09D 175/06* (2013.01); *C08G 18/10* (2013.01); *C08G 77/458* (2013.01); *C08L 75/06* (2013.01); *C09D 4/00* (2013.01); *C09D 5/32* (2013.01); *C09D 7/20* (2018.01); *C09D 7/63* (2018.01); *C09D 175/04* (2013.01); *C09D 183/04* (2013.01); *C09D 183/06* (2013.01)

(58) Field of Classification Search

CPC .... B60J 1/2094; C09D 175/04; C09D 175/06; C09D 183/04; C08G 77/14; C08G 17/458; C08G 18/10; C08L 75/06; C08L 83/06; C08K 5/005; C08K 5/0075

See application file for complete search history.

(56) References Cited

U.S. PATENT DOCUMENTS

| | | | | |
|---|---|---|---|---|
| 3,562,352 | A * | 2/1971 | Nyilas | C08L 75/04 428/36.1 |
| 3,881,043 | A | 4/1975 | Reiser et al. | |
| 4,164,491 | A | 8/1979 | Fukuda et al. | |
| 5,760,155 | A | 6/1998 | Mowrer et al. | |
| 6,458,875 | B1 | 10/2002 | Sandlin et al. | |
| 8,785,587 | B2 | 7/2014 | Wagner et al. | |
| 9,580,564 | B2 | 2/2017 | Moncur et al. | |
| 9,695,270 | B2 | 7/2017 | Hase et al. | |
| 2004/0087752 | A1 | 5/2004 | Schindler et al. | |
| 2005/0074617 | A1 | 4/2005 | Lin et al. | |
| 2005/0100740 | A1 | 5/2005 | Lin et al. | |
| 2005/0148752 | A1 | 7/2005 | Klaasens et al. | |
| 2007/0129528 | A1* | 6/2007 | Huang | C08L 75/04 528/78 |
| 2008/0064825 | A1 | 3/2008 | Jing et al. | |
| 2009/0291777 | A1 | 11/2009 | Rajagopalan et al. | |
| 2009/0311536 | A1 | 12/2009 | Kojima et al. | |
| 2010/0317787 | A1 | 12/2010 | Baghdachi et al. | |
| 2012/0305849 | A1 | 12/2012 | Lee et al. | |
| 2013/0142957 | A1 | 6/2013 | Connelly et al. | |
| 2014/0088219 | A1 | 3/2014 | Chen et al. | |
| 2014/0212584 | A1 | 7/2014 | Tang et al. | |
| 2014/0272424 | A1 | 9/2014 | Olson | |
| 2015/0024157 | A1 | 1/2015 | Tullberg | |
| 2016/0115351 | A1* | 4/2016 | Lezzi | C08G 18/837 524/588 |
| 2017/0369736 | A1 | 12/2017 | Stache et al. | |
| 2019/0153259 | A1 | 5/2019 | Li et al. | |

FOREIGN PATENT DOCUMENTS

| | | | |
|---|---|---|---|
| CN | 1200742 | A | 12/1998 |
| CN | 1239127 | A | 12/1999 |
| CN | 1662581 | A | 8/2005 |
| CN | 101395497 | A | 3/2009 |
| CN | 101883804 | A | 11/2010 |

(Continued)

OTHER PUBLICATIONS

Zhang et al.; "Research of Two—component Waterborne Polyurethane Coatings and Film—forming Process"; China Leather; vol. 40 No. 7; Apr. 2011; p. 52-55 (contains English Translation).
Yang et al.; "Preparation and Application Research Progress of Silane-terminated Polyurethane"; Silicone Material; vol. 28 No. 6; Nov. 2014; p. 459-464 (contains English Translation).
Guo et al.; "Development of Nanosilicon dioxide Modified Waterborne Automobile Coatings"; Shanghai Coatings; vol. 54 No. 6; Nov. 2016; p. 16-19 (contains English Translation).
Chattopadhyay et al.; "Thermal stability and flame retardancy of polyurethanes"; Progress in Polymer Science; vol. 34; 2009; p. 1068-1133.
Duan et al.; "Self-crosslinkable poly(urethane urea)-reinforced silica aerogels"; RSC Advances; vol. 5; 2015; p. 71551-71558.

(Continued)

*Primary Examiner* — Sophie Hon
(74) *Attorney, Agent, or Firm* — BakerHostetler

(57) ABSTRACT

Disclosed are polyurethane-polysiloxane hybrid coating compositions (PUPSHCC) and their uses, processes for their preparation, and substrates incorporating the coating compositions.

35 Claims, No Drawings

(56) References Cited

FOREIGN PATENT DOCUMENTS

| | | | | | |
|---|---|---|---|---|---|
| CN | 101910233 A | | 12/2010 | | |
| CN | 105308136 A | | 2/2016 | | |
| CN | 106675370 A | | 5/2017 | | |
| CN | 115038760 B | * | 11/2023 | .............. | C08L 75/06 |
| DE | 102007027027 A1 | | 12/2008 | | |
| EP | 0354014 A2 | | 2/1990 | | |
| EP | 0405494 A2 | | 1/1991 | | |
| EP | 0852594 A1 | | 7/1998 | | |
| EP | 1251146 B1 | | 9/2006 | | |
| EP | 2157109 A1 | | 2/2010 | | |
| EP | 2236564 A1 | | 10/2010 | | |
| EP | 2410004 A1 | | 1/2012 | | |
| EP | 2518095 A1 | | 10/2012 | | |
| EP | 3263616 A1 | | 1/2018 | | |
| EP | 2671906 B1 | | 8/2018 | | |
| EP | 3448903 A1 | | 3/2019 | | |
| EP | 4090710 B1 | * | 1/2025 | ........... | C09D 183/06 |
| FR | 2213301 | | 8/1974 | | |
| GB | 1461932 A | | 1/1977 | | |
| JP | H10-088010 A | | 4/1998 | | |
| JP | 2000-119524 A | | 4/2000 | | |
| JP | 2001-064346 A | | 3/2001 | | |
| JP | 2003-286405 A | | 10/2003 | | |
| JP | 2003-286406 A | | 10/2003 | | |
| JP | 2005-154587 A | | 6/2005 | | |
| JP | 2012-126819 A | | 7/2012 | | |
| JP | 2013-518980 A | | 5/2013 | | |
| JP | 2016-014084 A | | 1/2016 | | |
| JP | 2018-003016 A | | 1/2018 | | |
| JP | 7633262 B2 | * | 2/2025 | ........... | C09D 183/06 |
| WO | WO 1994/013723 A1 | | 6/1994 | | |
| WO | WO 1997/011983 A1 | | 4/1997 | | |
| WO | WO 2002/088254 A1 | | 11/2002 | | |
| WO | WO 2006/055038 A1 | | 5/2006 | | |
| WO | WO 2007/064621 A2 | | 6/2007 | | |
| WO | WO 2007/064792 A2 | | 6/2007 | | |
| WO | WO 2007/075497 A2 | | 7/2007 | | |
| WO | WO 2007/108971 A2 | | 9/2007 | | |
| WO | WO 2008/007779 A1 | | 1/2008 | | |
| WO | WO 2008/142109 A1 | | 11/2008 | | |
| WO | WO 2009/112417 A1 | | 9/2009 | | |
| WO | WO 2009/112418 A1 | | 9/2009 | | |
| WO | WO 2009/143003 A1 | | 11/2009 | | |
| WO | WO 2011/099709 A2 | | 8/2011 | | |
| WO | WO 2015/035068 A1 | | 3/2015 | | |
| WO | WO 2015/122909 A1 | | 8/2015 | | |
| WO | WO 2015/179902 A1 | | 12/2015 | | |
| WO | WO 2015/179903 A1 | | 12/2015 | | |
| WO | WO 2016/058104 A1 | | 4/2016 | | |
| WO | WO 2016/064481 A1 | | 4/2016 | | |
| WO | WO 2017/189057 A1 | | 11/2017 | | |
| WO | WO 2017/202692 A1 | | 11/2017 | | |
| WO | WO 2018/156864 A1 | | 8/2018 | | |
| WO | WO 2018/199927 A1 | | 11/2018 | | |

OTHER PUBLICATIONS

Gao et al.; “Effect of pigmentation on polyurethane/polysiloxane hybrid coatings”; Journal of Applied Polymer Science; vol. 133; Oct. 2015; 17 pages.

He et al.; “Effect of mixed sol-gel precursors on inorganic-organic polyurethane hybrid thermosets: DOE study”; Progress in Organic Coatings; vol. 133; 2019; p. 237-248.

He et al.; “Inhibition of acid undercutting of inorganic/organic hybrid polyurethane Coatings”; Progress in Organic Coatings; vol. 134; 2019; p. 169-176.

Jiang et al.; “Alkoxysilane Functionalized Polyurethane/Polysiloxane Copolymers: Synthesis and the Effect of End-Capping Agent”; Polymer Bulletin; vol. 59; 2007; p. 53-63.

Ni et al.; “Polyurethane/Polysiloxane Ceramer Coatings: Evaluation of Corrosion Protection”; Macromol. Mater. Eng.; vol. 287; 2002; p. 470-479.

Warren H. Philipp; “Polysiloxanes Derived From the Controlled Hydrolysis Tetraethoxysilane as Precursors to Silica for Use in Ceramic Processing”; NASA Technical Memorandum 102489; Jan. 1990; 22 pages.

Soucek et al.; “Nanostructured Polyurethane Ceramer Coatings for Aircraft”; Journal of Coatings Technology; vol. 74 No. 933; Oct. 2002; p. 125-134.

Zhang et al.; “Synthesis and Properties of Self-Crosslinkable Polyurethane—Urea with Silsesquioxane Formation”; Journal of Applied Polymer Science; vol. 91; 2004; p. 190-195.

Zhao et al.; “Preparation and Characterization of Polyurethanes with Cross-Linked Siloxane in the Side Chain by Sol-Gel Reactions”; Materials; vol. 10; 2017; 15 pages.

International Patent Application No. PCT/US2021/013209; Int'l Search Report and the Written Opinion; dated May 3, 2021; 15 pages.

International Patent Application No. PCT/US2021/013209; Int'l Preliminary Report on Patentability; dated Jul. 28, 2022; 9 pages.

Mikhailova et al.; “Heat-Resistant and Anti-Corrosion Urethane-Silicone-based Coatings”; Silicon; vol. 4 No. 3; 2012; p. 197-208.

* cited by examiner

COATING COMPOSITIONS

CROSS-REFERENCE TO RELATED APPLICATIONS

This application is the National Stage of International Patent Application No. PCT/US2021/013209, filed Jan. 13, 2021, which claims priority to Great Britain Patent Application No. 2000544.3, filed Jan. 14, 2020, the disclosures of which are incorporated herein by reference in their entireties for any and all purposes.

BACKGROUND OF THE INVENTION

The present invention relates generally to polyurethane-polysiloxane hybrid coating compositions (PUPSHCC), processes for preparing the coating compositions, and to coated substrates, such as aircraft transparencies incorporating the coating compositions. The invention particularly relates to transparent coating compositions and coated aircraft transparencies having enhanced erosion resistance, abrasion/scratch resistance, electrostatic dissipation capability and environmental durability.

Transparencies used for modern aircraft often require a protective coating or film located on the outer surface to prevent damage to fragile underlying metal or ceramic or polymeric conductive coatings, such as gold, silver or indium tin oxide (ITO) or carbon nanotube (CNT). Such surface protective coating and the underlying conductive layers form a multilayer electrostatic dissipative (ESD) coating system to provide the transparencies with erosion resistance, abrasion/scratch resistance, electrostatic dissipation capability and environmental durability. Organic polyurethane coating and sol-gel based polysiloxane coating are the two major families of such surface protective coatings used for these applications with respect to their super light transmission and high optical clarity.

Polyester-based polyurethane coating possesses elastomeric behaviors demonstrating excellent flexibility, toughness, tear, erosion resistance, and impact resistance while it is low hardness and thus lacks abrasion/scratch resistance. Sol-gel based polysiloxane coating, on the other hand, bears glassy behaviors exhibiting high hardness, abrasion resistance, and scratch resistance while it is brittle and thus lacks erosion resistance and impact resistance. Such property differences result in application differentiations of polyurethane coating and polysiloxane coating. Polyurethane coating is selected as surface protective coating of ESD coating system for such transparencies as military canopies, pilot windshields, and cockpit windows where high erosion resistance is a necessity. Polysiloxane coating is preferably used as surface protective coating for passenger cabin windows or side windows where erosion resistance is less demanding. Therefore, either the organic polyurethane coating or the sol-gel based polysiloxane coating is considered not fully satisfactory as a universal surface protective coating of ESD coating system for transparencies used for modern aircraft. This is the current state-of-the-art with surface protective coating for aircraft transparencies. It can readily be appreciated that there is a need for a transparent coating composition having the combined advantageous properties of good erosion resistance and impact resistance as well as good abrasion resistance and scratch resistance, in addition to electrostatic dissipation capability and environmental durability.

SUMMARY OF THE INVENTION

The present invention provides a two-part curable coating composition comprising: (A) a composition comprising an alkoxysilane terminated polyester urethane prepolymer, and (B) a composition comprising a silanol terminated polysiloxane prepolymer. In one aspect, the two-part curable coating composition comprises:

(A) a composition comprising an alkoxysilane terminated polyester urethane prepolymer, comprising a prepolymer chain having a terminal group of general formula (I):

(I)

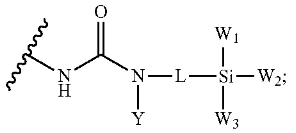

wherein:

Y represents: H; $R_1$ wherein $R_1$ represents hydrocarbyl preferably alkyl or aryl; or wherein Y represents the group:

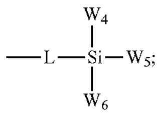

L represents a hydrocarbylene group, preferably an alkylene or an arylene group, preferably a $C_1$ to $C_{10}$ hydrocarbylene group, and preferably methylene, ethylene, or propylene and most preferably propyl;

$W_1$, $W_2$, $W_3$, $W_4$, $W_5$ and $W_6$ may be the same or different and each independently represents —$OR_2$, wherein $R_2$ at each occurrence may be the same or different, and each $R_2$ is independently selected from an alkyl group, preferably wherein the alkyl group has 1 to 10 carbon atoms, and preferably wherein the alkyl group has 1 to 8 atoms, preferably methyl or ethyl, and most preferably methyl;

and (B) a composition comprising a silanol terminated polysiloxane prepolymer obtainable by sol-gel process of an alkoxysilane selected from a compound of general formula (II), (III) or (IV):

(II)

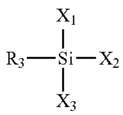

(III)

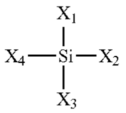

(IV)

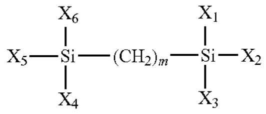

wherein:

$X_1$, $X_2$, $X_3$, $X_4$, $X_5$, and $X_6$ each represents —$OR_3$;

$R_3$ at each occurrence is the same or different, and each is independently selected from an alkyl group, preferably wherein the alkyl group has 1 to 10 carbon atoms, 1 to 8 atoms, 1 to 6 carbon atoms, and most preferably 1 to 4 carbon atoms; and m represents an integer from 1 to 6, preferably 1 to 3.

The composition preferably further comprises one or more additives selected from: one or more of the following: solvent; urethane forming catalyst; antistatic agent; stabilizer selected from one or more of a UV absorber, light stabilizer and thermal stabilizer; and surface active agent selected from one or more of a flow or levelling agent and surfactant. Preferably, the composition comprises at least two solvents, a urethane forming catalyst, an antistatic agent, an UV absorber, a light stabilizer, a thermal stabilizer, and a surfactant.

The alkoxysilane-terminated polyester urethane prepolymer (A) may be obtained by a process comprising: (i) reacting an aliphatic diisocyanate with a polyester diol to form an isocyanate-terminated polyester urethane prepolymer; and (ii) silanization of the isocyanate-terminated polyester urethane prepolymer with an amino-functional alkoxysilane. The silanol terminated polysiloxane prepolymer (B) may be obtained by sol-gel process of an alkoxysilane selected from the group consisting of: a trialkoxysilane, an alkylorthosilicate, or a bis(trialkyloxysilyl)alkane; and preferably an alkyl orthosilicate.

The present invention further provides a polyurethane-polysiloxane hybrid coating composition (PUPSHCC) precursor, which is obtainable by a process comprising mixing or compounding the composition (A) and composition (B). A polyurethane-polysiloxane hybrid coating composition (PUPSHCC) according to the present invention is obtainable by a process comprising thermally curing the PUPSHCC precursor.

A further aspect of the present invention provides a process for preparing a two-part curable coating composition comprising: (1) preparing an alkoxysilane-terminated polyester urethane prepolymer (A) by a process comprising (i) reacting an aliphatic diisocyanate with a polyester diol to form an isocyanate-terminated polyester urethane prepolymer; and (ii) silanization of the isocyanate-terminated polyester urethane prepolymer with an amino-alkoxysilane as described herein; and (2) preparing a silanol terminated polysiloxane prepolymer (B) by sol-gel process of an alkoxysiloxane with at least one acid, in the presence of a solvent comprising an alcohol and water as described herein.

The present invention additionally provides the use of the two-part curable coating composition as a coating for a substrate such as in aircrafts, particularly aircraft transparencies. The invention further provides a substrate which is coated with the polyurethane-polysiloxane hybrid polymer coating composition of the invention.

In a further aspect, a substrate which is coated with the polyurethane-polysiloxane hybrid polymer coating composition of the invention may be prepared by a process comprising applying the polyurethane-polysiloxane hybrid coating composition precursor disclosed herein to the surface of a substrate, and thermally curing the coating composition precursor.

DETAILED DESCRIPTION OF THE INVENTION

The present invention utilizes the erosion- and impact-resistance properties of organic polyurethane coatings with the abrasion and scratch-resistance properties of sol-gel based polysiloxane coatings by providing unique, modified hybrid compositions. The compositions of the present invention can advantageously be applied as a single coating onto the outer surface of a substrate such as an aircraft transparency, to provide a transparency having a surface protective layer with desirable erosion resistance and abrasion resistance properties, in addition to electrostatic dissipation capability and environmental durability.

The present invention provides a polyurethane-polysiloxane hybrid coating composition (PUPSHCC) having advantageous properties of erosion resistance, impact resistance as well as abrasion resistance and scratch resistance, in addition to the electrostatic dissipation capability and environmental durability, and thus is highly suitable as a surface coating, particularly as a universal surface protective coating of ESD coating system, for transparencies such as those used in modern aircraft.

Unless otherwise indicated, the term "hydrocarbyl" used herein throughout refers to monovalent group formed by removal of a hydrogen from a hydrocarbon group. The term "hydrocarbyl" includes a saturated or unsaturated hydrocarbyl group, which may be aliphatic, cyclic, or aromatic. The term "hydrocarbyl" preferably refers to monovalent hydrocarbyl radicals containing 1 to 10 carbon atoms, particularly 1 to 8 carbon atoms, more particularly 1 to 6 carbon atoms, and most particularly 1 to 4 carbon atoms, which may be linear, branched, cyclic, saturated and unsaturated species, such as alkyl, alkenyl, cyclic alkyl or cyclic alkenyl, aryl, alkaryl or aralkyl groups. Particularly preferred hydrocarbyl groups are methyl and ethyl.

The term "hydrocarbylene" used herein, unless otherwise indicated, refers to a divalent group formed by removal of two hydrogens from a hydrocarbon group. The term "hydrocarbylene" includes a saturated or unsaturated hydrocarbylene group, which may be aliphatic, cyclic or aromatics. The term "hydrocarbylene" preferably refers to divalent hydrocarbylene radicals preferably an alkylene or arylene group containing 1 to 10 carbon atoms, particularly 1 to 8 carbon atoms, more particularly 1 to 6 carbon atoms, and most particularly 1 to 4 carbon atoms, which may be linear, branched, cyclic, saturated and unsaturated species, such as alkylene, alkenylene, cyclic alkylene or cyclic alkenylene, arylene, alkarylene or aralkylene groups. Particularly preferred hydrocarbyl groups are methylene, ethylene and propylene, and especially propylene.

The term "urethane grade solvent" refers to a solvent having 0.05 wt. % or less of water. The invention generally provides a two-part curable coating composition comprising: (A) a composition comprising an alkoxysilane terminated polyester urethane prepolymer and (B) a composition comprising a silanol terminated polysiloxane prepolymer obtainable by sol-gel process of an alkoxysilane. The compositions (A) and (B), when compounded to form a polyurethane-polysiloxane hybrid coating composition (PUPSHCC) precursor, which can be applied to a surface of a substrate, and cured, optionally in the presence of a catalyst, in order to form a polyurethane-polysiloxane hybrid coating composition having advantageous properties such as one or more of high erosion resistance, high abrasion or scratch resistance and impact resistance In one aspect, the invention provides a two-part curable coating composition comprising: (A) a composition comprising an alkoxysilane terminated polyester urethane prepolymer, comprising a prepolymer chain having a terminal group of general formula (I):

(I)

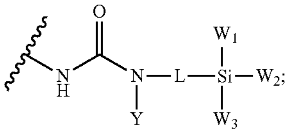

wherein:

Y represents: H; $R_1$ wherein $R_1$ represents hydrocarbyl (preferably $R_1$ represents alkyl or aryl); or alternative Y represents the group:

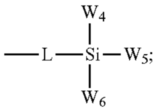

L represents a hydrocarbylene group (preferably L represents an alkylene or an arylene group, preferably a $C_1$ to $C_{10}$ hydrocarbylene group, and preferably methylene, ethylene, or propylene and most preferably propylene);

$W_1$, $W_2$, $W_3$, $W_4$, $W_5$ and $W_6$ may be the same or different and each independently represents —$OR_2$, wherein $R_2$ at each occurrence may be the same or different, and each $R_2$ is independently selected from an alkyl group, preferably wherein the alkyl group has 1 to 10 carbon atoms, and preferably wherein the alkyl group has 1 to 8 atoms, preferably methyl or ethyl, and most preferably methyl;

and (B) a composition comprising a silanol terminated polysiloxane prepolymer obtainable by sol-gel process of an alkoxysilane selected from a compound of general formula (II), (III) or (IV):

(II)

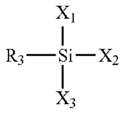

(III)

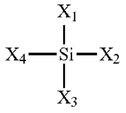

(IV)

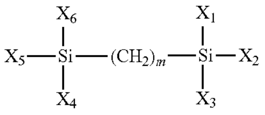

wherein:

$X_1$, $X_2$, $X_3$, $X_4$, $X_5$, and $X_6$ each represents —$OR_3$;

$R_3$ at each occurrence is the same or different, and each is independently selected from an alkyl group (preferably wherein the alkyl group has 1 to 10 carbon atoms, 1 to 8 atoms, 1 to 6 carbon atoms, and most preferably 1 to 4 carbon atoms); and m represents an integer from 1 to 6, and preferably 1 to 3.

In any aspect or embodiment of the present invention, preferably $R_1$ at each occurrence is the same or different, and each is independently selected from: a $C_1$ to $C_6$ alkyl, or a $C_1$ to $C_4$ alkyl group. Preferably $R_1$ at each occurrence is the same, and each represents a $C_1$ to $C_6$ alkyl, or a $C_1$ to $C_4$ alkyl group, and preferably a methyl or ethyl group.

In any aspect or embodiment, the group Y is preferably H.

In order to provide additional advantageous properties to the coating compositions, various additives may be added to the compositions. The additives may be added to the compositions (A) and/or (B), either during the process for their preparation, or after their preparation. Preferably, the compositions (A) and (B) include at one or more of the following: one or more solvents; a urethane forming catalyst; an antistatic agent; one or more stabilizers selected from one or more of a UV absorber, light stabilizer and thermal stabilizer; and surface active agent selected from one or more of a flow or levelling agent and surfactant.

In any embodiment of the present invention, composition (A) preferably further comprises an alkoxysilane terminated polyester urethane prepolymer, at least one solvent, a flow or levelling agent, at least one stabilizer, a urethane forming catalyst and a surface additive. In a preferred embodiment, the solvent, flow or levelling agent, stabilizer, urethane forming catalyst and surface additive are added during the reaction to prepare the alkoxysilane terminated polyester urethane prepolymer in component (A).

In any embodiment of the present invention, composition (B) further comprises a silanol terminated polysiloxane prepolymer obtainable by sol-gel process of an alkoxysilane selected from a compound of general formula (II), (III) or (IV), at least one solvent, and an antistatic additive. In a preferred embodiment, the solvent is present in the reaction mixture, and the antistatic additive is added after the sol-gel process.

Preferably, in any embodiment of the present invention, composition (A) comprises an alkoxysilane terminated polyester urethane prepolymer, at least one solvent, a flow or levelling agent, at least one stabilizer, a urethane forming catalyst and a surface additive; and composition (B) further comprise at least one solvent, and an antistatic additive.

The various additives are discussed in more detail below.

Solvents

The compositions of the present invention preferably comprise solvents as the composition media and carrier. The solvents act as a media to improve flow properties and to facilitate the application of the compositions as a coating to the surface of a substrate. Urethane grade solvents are preferably used.

In any aspect or embodiment of the present invention, the two-part curable composition preferably comprises at least one solvent, and more preferably comprises two or more solvents. Preferably, composition (A) comprises an aprotic solvent and a protic solvent. Particularly suitable aprotic solvents may be selected from the group consisting of ethyl 3-ethoxypropionate (EEP), n-pentyl propionate (nPP), 2-butoxyethyl acetate (BEA), di-isobutyl ketone (DIBK), and methyl isobutyl ketone (MBK), or a combination thereof. EEP is a particularly preferred aprotic solvent. Preferred protic solvents include a hydroxyketone, preferably a β-hydroxyketone, and more preferably diacetone alcohol (DAA). The solvents may be present as a reaction solvent during the preparation of the alkoxysilane terminated polyester urethane prepolymer and/or may be added after their preparation. For example, during the preparation of the isocyanate-terminated polyester urethane prepolymer, the aprotic solvent as described above is used to dilute the prepolymer and serve as the prepolymer media.

In a preferred embodiment, the composition (A) comprises an alkoxysilane terminated polyester urethane prepolymer and a mixture of ethyl 3-ethoxypropionate and diacetone alcohol.

Preferably, composition (B) comprises one or more protic solvents, such as water, or an alcohol, and more preferably water and ethanol. Typically the solvents are present in the sol-gel process for preparing the silanol terminated polysiloxane prepolymer.

Protic solvents such as diacetone alcohol (DAA) are good solvents for both the organic polyurethane portion and the sol-gel based polysiloxane portion. DAA may be advantageously used as a co-solvent with EEP for the PUPSHCC. The protic solvent, such as DAA, is mixed with the isocyanate-terminated polyester urethane prepolymer mixture as media for alkoxysilane-terminated polyester urethane prepolymer formation by silanization of the isocyanate-terminated polyester urethane prepolymer with the amino-functional alkoxysilane coupling agent 3-aminopropyltrimethoxysilane (APTMS).

Urethane Forming Catalyst

A urethane forming catalyst is preferably used for preparation of the isocyanate-terminated polyester urethane prepolymer [the precursor to the alkoxysilane terminated polyester urethane prepolymer of composition (A)] and for the thermal curing of the polyurethane-polysiloxane hybrid coating composition.

The urethane forming catalyst accelerates the urethane linkage formation. Representative catalysts which are suitable for this invention include organo-metallic compounds dibutyltin dilaurate and dibutyltin diacetate available from Sigma-Aldrich and bismuth and zinc compounds available from Shepherd Chemical Company. The catalyst is typically used in the range of 0.1 ppm to 100 ppm, and more typically in the range of 1 to 10 ppm, based on the total weight of solids in the composition.

Preferably, the catalyst is selected from the group consisting of: dibutyltin dilaurate (DBTDL) or dibutyltin diacetate (DBTDA).

In some embodiments, the urethane forming catalyst is present in composition (A) of the two-part curable composition, for example, as the catalyst used to prepare the isocyanate-terminated polyester urethane prepolymer precursor to the alkoxysilane terminated polyester urethane prepolymer. The catalyst present in the preparation of the isocyanate-terminated polyester urethane prepolymer may be carried over to alkoxysilane terminated polyester urethane prepolymer in sufficient quantities to catalyse the thermal curing of the polyurethane-polysiloxane hybrid coating composition. In some embodiments, additional catalyst may be added prior to the final curing step (e.g. during the compounding step as describe below) in order to accelerate the curing process.

Antistatic Agent

When the coating compositions of the present invention are to be utilized as protective coatings for aircraft, it is desirable to provide static dissipative properties, since the outer surface of an aircraft transparency is typically subject to electrostatic charging, especially in high performance modern aircraft. This charging is caused by contact with ice crystals and other particles during flight, which results in transfer of a charge to the surface via triboelectric or frictional effects. This phenomenon is called precipitation charging, or p-static charging, in the industry.

P-static charging of a non-conductive (dielectric) outer surface of an aircraft transparency can create several serious problems affecting aircraft performance, transparency service life, and personnel safety. Discharge during flight can result in damage to outer coating layers from dielectric breakdown or can result in electronic interference with instruments. Such charge accumulation can also create shock hazards for flight and ground personnel.

To prevent these problems caused by p-static charging, the outer layer of an aircraft transparency should be sufficiently conductive to allow the charge to drain across the surface to the airframe or through the thickness of the layer to an underlying grounded conductive layer. In such applications, antistatic agents are used in the two-part curable compositions of the present invention.

Thus, in any aspect or embodiment of the present invention, the two-part curable composition may further comprise an antistatic agent, preferably wherein the antistatic agent is a hydrophilic or a hydrophobic antistatic agent, more preferably wherein the antistatic agent is a salt of (bis)trifluoromethane-sulfonimide, particularly wherein the antistatic agent is: lithium (bis)trifluoromethanesulfonimide, tri-n-butylmethylammonium bis-(trifluoromethanesulfonyl)-imide, or a quaternary alkyl ammonium salt of (bis)trifluoromethane-sulfonimide. These antistatic agents are available from 3M as Fluorad HQ 115, FC-4400 or FC-5000, respectively. Antistatic additive Fluorad HQ 115 is a hydrophilic ionic solid salt of lithium and fluorinated imide with formula Li+ —$N(SO_2CF_3)_2$. Antistatic additive FC-4400 is a hydrophobic ionic liquid salt of quaternary ammonium and fluorinated imide with formula $(n\text{-}C_4H_9)_3(CH_3)N^+$ —$N(SO_2CF_3)_2$. Antistatic additive FC-5000 is a hydrophobic ionic liquid salt of quaternary ammonium and fluorinated imide with single primary alcohol group on quaternary ammonium with formula $R_4N^+$ —$N(SO_2CF_3)_2$. The antistatic additive is typically used in the range of 1 to 5, and more typically in the range of 2 to 3 weight percent, based on the total weight of solids in the composition. Most preferably lithium (bis)trifluoromethanesulfonimide (Fluorad HQ 115) is used as the antistatic agent.

The two-part curable composition according to any aspect or embodiment of the present invention preferably comprises an antistatic agent in an amount of about 1 wt % to about 5 wt %, and preferably about 2 wt % to about 3 wt %, based on the total weight of solids in the composition.

Stabilizers

The use of stabilizers in the compositions of the present invention can significantly enhance the environmental durability of the resulting PUPSHCC when used as a surface protective coating of ESD coating system for transparencies used for modern aircraft. Hence, in any aspect or embodiment of the present invention, the compositions may further comprise one or more stabilizers such as: a UV absorber, a light stabilizer, and a thermal stabilizer. These stabilizers, particularly when used in combination (i.e. as a package of stabilisers), provide effective stabilization against the detrimental effects of light and weathering.

Preferably, the compositions of the present invention comprise at least one UV absorber. Suitable UV absorbers are preferably selected from the hydroxyphenyl-triazine, hydroxyphenyl-benzotriazole or hydroxyphenyl-benzophenone classes of UV absorbers. The UV absorber competitively absorbs the UV light that may be detrimental to the hybrid coating composition.

Representative UV absorbers which are suitable for this invention include Tinuvin 400, Tinuvin 405, Tinuvin 460, Tinuvin 477, and Tinuvin 479 of the hydroxyphenyl-triazine class and Tinuvin 928, Tinuvin 1130, Tinuvin 328, Tinuvin 99-2, and Tinuvin 384-2 of the hydroxyphenyl-benzotriazole class, available from BASF. The preferred UV absorber for this invention is Tinuvin 479, which advantageously has an extremely high extinction coefficient in the UV-B and UV-A range. The high extinction coefficient allows formulation of the composition with reduced UV absorber content.

Thus, in any aspect or embodiment of the present invention, the compositions comprise at least one UV absorber, preferably selected from:

- a mixture of 2-[4-[2-Hydroxy-3-tridecyloxypropyl]oxy]-2-hydroxyphenyl]-4,6-bis(2,4-dimethylphenyl)-1,3,5-triazine and 2-[4-[2-hydroxy-3-didecyloxypropyl]oxy]-2-hydroxyphenyl]-4,6-bis(2,4-dimethylphenyl)-1,3,5-triazine (Tinuvin 400);
- [2-hydroxy-4-[3-(2-ethylhexyl-1-oxy)-2-hydroxypropyloxy]phenyl]-4,6bis(2,4-dimethylphenyl)-1,3,5-triazine) (Tinuvin 405);
- 2,4-bis(2-hydroxy-4-butoxyphenyl)-6-(2,4-dibutoxyphenyl)-1,3,5-triazine (Tinuvin 460);
- 2-hydroxyphenyl-s-triazine with 18-20% 2-methoxy-1-propyl-acetate (Tinuvin 477);
- 6-methylheptyl 2-[4-[4,6-bis(4-phenylphenyl)-1H-1,3,5-triazin-2-ylidene]-3-oxocyclohexa-1,5-dien-1-yl]oxypropanoate (Tinuvin 479)
- 2-(2H-benzotriazol-2-yl)-6-(1-methyl-1-phenylethyl)-4-(1,1,3,3-tetramethylbutyl)phenol (Tinuvin 928);
- a mixture of: a) 50% b-[3-(2-H-Benzotriazole-2-yl)-4-hydroxy-5-tert.butylphenyl]-propionic acidpoly(ethylene glycol) 300-ester and b) 50% Bis{b-[3-(2-H-Benzotriazole-2-yl)-4-hydroxy-5-tert.butylphenyl]-propionic acid}-poly(ethylene glycol) 300-ester (Tinuvin 1130);
- 2-(benzotriazol-2-yl)-4,6-bis(2-methylbutan-2-yl)phenol (Tinuvin 328);
- a mixture of 95% Benzenepropanoic acid, 3-(2H-benzotriazol-2-yl)-5-(1,1-dimethylethyl)-4-hydroxy-, $C_{7-9}$-branched and linear alkyl esters and 5% 2-Propanol, 1-methoxy-, 2-acetate (Tinuvin 99-2), and
- a mixture of 95% Benzenepropanoic acid, 3-(2H-benzotriazol-2-yl)-5-(1,1-dimethylethyl)-4-hydroxy-, C7-9-branched and linear alkyl esters and 5% 1-methoxy-2-propyl acetate (Tinuvin 384-2).

Tinuvin 479 is a particularly preferred UV absorber.

Preferably, the compositions of the present invention comprise at least one light stabilizer (light absorber). The light stabilizer is preferably a hindered amine light stabilizer (HALS). Such stabilizers are capable of trapping free radicals and acts as radical scavengers in the autoxidation cycle and inhibits the photo-oxidative degradation of polymeric materials. Representative light stabilizers which are suitable for this invention include Tinuvin 123, Tinuvin 144, Tinuvin 152, Tinuvin 292, or Tinuvin 5100, available from BASF. The preferred light stabilizer for this invention is Tinuvin 152 having reactive primary hydroxyl which enables Tinuvin 152 to be cured into the polyurethane-polysiloxane networks so as to improve compatibility and resistance to migration.

In any aspect or embodiment of the present invention, the compositions of the present invention preferably comprise a light absorber selected from the group consisting of:

- decanedioic acid, bis (2,2,6,6-tetramethyl-1-(octyloxy)-4-piperidinyl) ester (Tinuvin 123);
- bis(1,2,2,6,6-pentamethyl-4-piperidinyl)-[[3,5-bis(1,1-dimethylethyl)-4-hydroxyphenyl]methyl]butylmalonate (Tinuvin 144);
- 2,4-bis[N-butyl-N-(1-cyclohexyloxy-2,2,6,6-tetramethylpiperidin-4-yl)amino]-6-(2-hydroxyethylamine)-1,3,5-triazine (Tinuvin 152);
- mixture of bis(1,2,2,6,6-pentamethyl-4-piperidinyl)sebacate (75-85%) and methyl 1,2,2,6,6-pentamethyl-4-piperidyl sebacate (15-25%) (Tinuvin 292); or
- a liquid, non-basic amino-ether (NOR) non-interacting hindered amine light stabilizer (Tinuvin 5100).

Particularly, the light absorber is selected from the group consisting of: Tinuvin 123, Tinuvin 144, Tinuvin 152 and Tinuvin 292; or Tinuvin 123, Tinuvin 152 and Tinuvin 292.

According to any aspect or embodiment of the present invention, the compositions disclosed herein preferably comprise at least one thermal stabilizer. The thermal stabilizer is typically a sterically hindered phenolic antioxidant that protects the composition against thermo-oxidative degradation. Representative thermal stabilizers which are suitable for this invention include IRGANOX 1010, IRGANOX 1076, IRGANOX 1135, or IRGANOX 245, available from BASF. Low color, good compatibility, high resistance to extraction and low volatility are typical selecting standard for the thermal stabilizer for application in this composition and IRGANOX 1010 is the preferred one.

Preferred thermal stabilizers are selected from the group consisting of: pentaerythritol tetrakis(3-(3,5-di-tert-butyl-4-hydroxyphenyl)propionate) (IRGANOX 1010); octadecyl 3-(3,5-di-tert-butyl-4-hydroxyphenyl)propionate (IRGANOX 1076); benzenepropanoic acid, 3,5-bis(1,1-dimethylethyl)-4-hydroxy-, C7-9-branched alkyl esters (IRGANOX 1135); and triethylene glycol bis(3-tert-butyl-4-hydroxy-5-methylphenyl)propionate (IRGANOX 245); and more preferably wherein the thermal stabilizer is pentaerythritol tetrakis(3-(3,5-di-tert-butyl-4-hydroxyphenyl)propionate) (IRGANOX 1010).

In any aspect or embodiment, the compositions of the present invention preferably comprises a stabilizer combination (i.e. a package of stabilizers) comprising: a UV absorber, a light absorber and a thermal stabilizer, and preferably wherein the composition comprises a stabilizer combination of: 6-methylheptyl 2-[4-[4,6-bis(4-phenylphenyl)-1H-1,3,5-triazin-2-ylidene]-3-oxocyclohexa-1,5-dien-1-yl]oxypropanoate (Tinuvin 479), 2,4-bis[N-butyl-N-(1-cyclohexyloxy-2,2,6,6-tetramethylpiperidin-4-yl)amino]-6-(2-hydroxyethylamine)-1,3,5-triazine (Tinuvin 152) and pentaerythritol tetrakis(3-(3,5-di-tert-butyl-4-hydroxyphenyl)propionate) (IRGANOX 1010). The package of stabilizers with combination of Tinuvin 479/Tinuvin 152/IRGANOX 1010 provides a particularly effective stabilization against the detrimental effects of light and weathering. The package of stabilizers such as the combination of Tinuvin 479/Tinuvin 152/IRGANOX 1010, can be added during the isocyanate-terminated polyester urethane prepolymer preparation.

In any aspect or embodiment of the present invention, the compositions of the present invention preferably comprise one or more stabilizers in a total amount of about 0.5 wt % to about 4 wt %, and preferably about 1 wt % to about 3 wt %, based on the total weight of solids in the two part curable composition.

Surface Active Agents

Surface active agents or surfactants may be favorably and optionally employed in the compositions of the invention in order to control the wetting or spreading action of the coating, provide the coating surfaces with a satisfactory flow-and-leveling properties, eliminate coating defects such as ruptures and craters, and/or increase surface slip. The surface active agents may include flow or levelling agents and/or surfactants.

Flow/Levelling Agents

According to any aspect or embodiment of the present invention, the compositions may optionally comprise a surface active agent which is a flow or levelling agent, preferably wherein the flow or levelling agent is a silicone-based flow or levelling agent, particularly a modified siloxane silicone based flow or levelling agent and more preferably wherein the flow or levelling agent is selected from the group consisting of:

polyethylene glycol mono(3-(tetramethyl-1-(trimethylsiloxy)disiloxanyl)propyl)ether (Silwet L-77);

a mixture of Siloxane Polyalkyleneoxide Copolymer and Octamethylcyclotetrasiloxane (Silwet L-7200);

an organosilicone of the Polyalkyleneoxide Modified Polydimethylsiloxane (Silwet L-7600);

an organosilicone surface tension reducing agent with Siloxane Polyalkyleneoxide Coplymer and Octamethylcyclotetrasiloxane (Silwet L-7604);

a polyether silicone of Polyalkyleneoxide Modified Polydimethylsiloxane (Silwet L-7605); and an organosilicone surface tension reducing agent with a Polyalkyleneoxide Modified Polydimethylsiloxane (Silwet L-7657).

available from Momentive Performance Materials. The Silwet silicone surfactants are modified trisiloxanes with outstanding wetting, spreading and leveling properties. The powerful Silwet L-77 that combines a very low molecular weight trisiloxane with a polyether group is preferred for this invention. Hence, the compositions of the present invention most preferably comprises as a flow or levelling agent, polyethylene glycol mono(3-(tetramethyl-1-(trimethylsiloxy)disiloxanyl)propyl)ether (Silwet L-77).

Surfactants

According to any aspect or embodiment of the present invention, the compositions may optionally comprise a surface active agent which is a surfactant. Representative surfactants which are suitable for this invention include BYK silicone surface additives which are modified polydimethylsiloxanes for increasing surface slip. More preferably, the surfactant is a polyether modified polydimethylsiloxane, or a polyester-modified polydimethylsiloxane. Particularly, the surfactants include those selected from the group consisting of:

polyether-modified polydimethylsiloxanes: BYK-300, BYK-306, BYK-313, and BYK-378, polyester-modified polydimethylsiloxanes: BYK-333 and BYK-370.

The reactive BYK-370 that is a polyester modified hydroxyl functional polydimethylsiloxane is particularly preferred. BYK-370 can be crosslinked into the polyurethane-polysiloxane networks via its primary OH-groups and can increase the surface slip permanently.

In any aspect or embodiment of the present invention, the compositions of the present invention comprises a flow or levelling agent which is polyethylene glycol mono(3-(tetramethyl-1-(trimethylsiloxy)disiloxanyl)propyl)ether Silwet L-77, and a surfactant which is BYK-370. The use of Silwet L-77 with BYK-370 provides an excellent combination of spreading/flow/leveling and permanent surface slip.

Preferably, each surface active agent is used in the range of 0.05 wt % to 1 wt %, more preferably in the range of 0.1 wt % to 0.5 wt %, based on the total weight of solids in the two part curable composition.

In a preferred embodiment, composition (A) comprises at least one flow or levelling agent (preferably polyethylene glycol mono(3-(tetramethyl-1-(trimethylsiloxy)disiloxanyl) propyl)ether Silwet L-77). The flow or leveling agent may be added to the reaction mixture for preparing the isocyanate-terminated polyester urethane prepolymer precursor to the alkoxysilane-terminated polyester urethane prepolymer. In another preferred embodiment, composition (A) further comprises at least one surfactant (preferably BYK-370), which may be added to the alkoxysilane-terminated polyester urethane prepolymer after the silanization reaction.

Alkoxysilane-Terminated Polyester Urethane Prepolymer

Preferably, the alkoxysilane-terminated polyester urethane prepolymer in composition (A) is obtainable by a process comprising:

(i) reacting an aliphatic diisocyanate with a polyester diol to form an isocyanate-terminated polyester urethane prepolymer; and (ii) silanization of the isocyanate-terminated polyester urethane prepolymer with an amino-functional alkoxysilane to form an alkoxysilane-terminated polyester urethane prepolymer.

Steps (i) and (ii) are described in more detail below.

Isocyanate-Terminated Polyester Urethane Prepolymer

The aliphatic diisocyanate in step (i) is preferably a monomeric aliphatic diisocyanate, or a monomeric cycloaliphatic diisocyanate. Particularly suitable aliphatic diisocyanates include those selected from the group consisting of: hexamethylene diisocyanate, methylene bis (4-cyclohexylisocyanate), and isophorone diisocyanate. An especially preferred aliphatic diisocyanate is methylene bis (4-cyclohexylisocyanate), available from Covestro as Desmodus W.

The polyester diol is preferably a polycaprolactone-based polyester diol, preferably a linear polyester diol derived from caprolactone monomer which is terminated by primary hydroxyl groups, more preferably wherein the polyester diol is obtainable by catalytic ring-opening polymerization of caprolactone monomer in the presence of a diol initiator. Preferably, the diol initiator is alkylenediol or an dialkyleneglycol initiator. More particularly, the diol initiator is selected from the group consisting of 1,4-butanediol (BDO), diethylene glycol (DEG) and neopentyl glycol (NEO), and most preferably, diethylene glycol.

Preferably, the polyester diol has a molecular weight of about 300 g/mol to about 5000 g/mol, preferably about 380 g/mol to about 4500 g/mol, or about 600 g/mol to about 1000 g/mol, or particularly about 700 g/mol to about 900 g/mol, and especially about 800 g/mol to about 850 g/mol.

Suitable polyester diols are preferably those obtainable by catalytic ring-opening polymerization of caprolactone in the presence of 1,4-butanediol, preferably having a molecular weight of about 700 g/mol to about 900 g/mol. Representative polyester diols which are suitable for preparation of the isocyanate-terminated polyester urethane prepolymer of this invention include polycaprolactone-based Capa 2043, Capa 2054, Capa 2085, Capa 2100, Capa 2125, Capa 2205, Capa 2304, and Capa 2402, with average molecular weight (g/mol) in the range of 400 to 4000, available from Perstorp Specialty Chemicals. The preferred polyester diol for this invention is Capa 2085. Preferably, the molar amount of the diisocyanate is in excess of the polyester diol. More preferably, the molar ratio of the polyester diol to aliphatic diisocyanate in step (i) is from: about 1:1.1 to about 1:5, about 1:1.1 to about 1:4, about 1:1.1 to about 1:2, about 1:1.3 to about 1:1.7, or about 1:1.6.

Typically, in the reaction step (i), about 40 to 70 percent of isocyanate functionality of the aliphatic diisocyanate is converted to urethane linkage by the polyester diol and the unreacted isocyanate functionality terminates the urethane prepolymer.

A urethane forming catalyst is advantageously used for preparation of the isocyanate-terminated polyester urethane prepolymer in step (i), and optionally in the subsequent thermal curing of the PUPSHCC. The catalyst accelerates the urethane linkage formation. Representative catalysts which are suitable for this invention include organo-metallic compounds dibutyltin dilaurate and dibutyltin diacetate available from Sigma-Aldrich and bismuth and zinc compounds available from Shepherd Chemical Company. Preferably the catalyst is dibutyltin dilaurate (DBTDL) or dibutyltin diacetate (DBTDA).

In a preferred embodiment, step (i) is carried out in the presence of a urethane forming catalyst (preferably dibutyltin dilaurate or dibutyltin diacetate). The catalyst may be used in used in an amount of 0.1 to 100, and more typically in the range of 1 to 10 ppm, based on the total weight of solids in the composition.

The urethane-forming catalyst is preferably carried through to the isocyanate-terminated polyester urethane prepolymer product in step (i) and to the alkoxysilane-terminated polyester urethane prepolymer component of composition (A) after the silanization step (ii). Advantageously, the urethane-forming catalyst present in the resulting composition (A) may enhance the curing step to prepare the final polyurethane-polysiloxane hybrid coating composition (PUPSHCC) without the need to add further catalyst prior to curing. However, if required a further quantity of the urethane forming catalyst may be added to prior to the curing step.

Where additives as described above are employed in the compositions of the invention to provide enhanced properties for certain applications of the coating compositions (such as for aircraft transparencies), some of the additives may be added to the reaction mixture for preparing the isocyanate-terminated polyester urethane prepolymer in step (i). Preferably, the reaction mixture in step (i) includes at least one additive selected from the group consisting of: one or more stabilizers, preferably a UV absorber, a light stabilizer and a thermal stabilizer preferably as described as above, and a flow/levelling agent as described above. More preferably the reaction mixture in step (i) includes a UV absorber, a light stabilizer, thermal stabilizer, and a flow/levelling agent.

In a particularly preferred embodiment, the reaction mixture in step (i) comprises the following additives: a stabilizer package comprising a combination of Tinuvin 479/Tinuvin 152/IRGANOX 1010; and a flow/levelling agent which is polyethylene glycol mono(3-(tetramethyl-1-(trimethylsiloxy)disiloxanyl)propyl)ether (Silwet L-77).

Step (i) preferably comprises heating the reaction mixture. The reaction mixture in step (i) is preferably heated to a temperature of: about 50° C. to about 120° C., or about 60° C. to about 100° C., or about 70° C. to about 90° C. Preferably, the reaction time in step (i) is about 1 to about 4 hours, or preferably about 1 to about 3 hours. During the reaction, the reaction mixture is preferably continuously agitated. Preferably the reaction is carried out in an inert atmosphere, and preferably under nitrogen.

Following the reaction, the reaction mixture is preferably cooled. The resulting isocyanate terminated polyester urethane prepolymer mixture may be diluted with a carrier solvent, step (i) may further comprise adding an aprotic solvent to the isocyanate-terminated polyester urethane prepolymer to form a homogeneous mixture having a solid content of about 20 to about 80 wt %, preferably about 30 to about 70 wt %, more preferably about 40 to about 60 wt % (particularly about 50 to about 55 wt %). The aprotic solvent may be the same solvent as employed in the reaction mixture, and is preferably selected from the group consisting of: ethyl 3-ethoxypropionate (EEP), n-pentyl propionate (nPP), 2-butoxyethyl acetate (BEA), diisobutyl ketone (DIBK), and methyl isobutyl ketone (MIBK), and more preferably 3-ethoxypropionate (EEP).

The product mixture comprising the isocyanate terminated polyester urethane prepolymer from step (i) may advantageously be stored in a seal container until required for the preparation of the alkoxysilane-terminated polyester urethane prepolymer. Typically, the product mixture from step (i) may have a pot life of up to about 6 months, or up to about 3 months.

In an illustrative example of the preparation of the isocyanate-terminated polyester urethane prepolymer of step (i), the aliphatic diisocyanate [such as methylene bis (4-cyclohexylisocyanate)—Desmodur W] and the polyester diol (such as Capa 2085 to 82° C. (180° F.) may be heated in a stainless steel mixing pot equipped with hot plate, agitator, nitrogen inlet and thermometer by heating held at this temperature for 2 hours with continuous agitation and nitrogen blanketing. The ratio of Desmodur W to polyester diol Capa 2085 is selected typically in the range of 20 to 80, and more typically in the range of 40 to 70 percent of isocyanate functionality of Desmodur W is converted to urethane linkage by the polyester diols and the unreacted isocyanate functionality terminates the urethane prepolymer. A urethane forming catalyst such as dibutyltin dilaurate (DBTDL) or dibutyltin diacetate (DBTDA) is added for accelerating the reaction of Desmodur W with Capa 2085. A package of stabilizers including a UV absorber, a light stabilizer, and a thermal stabilizer in the range of 0.5 to 4 weight percent for environmental durability enhancement and optional surface active agents or surfactants for flow/leveling control and enhancing coating surface cosmetics can also be conveniently added during the isocyanate-terminated polyester urethane prepolymer preparation. The resulting isocyanate-terminated polyester urethane prepolymer can be diluted with urethane grade aprotic solvent ethyl 3-ethoxypropionate (EEP) as a clear homogeneous mixture with solid content of approximately 50-60 weight percent.

Alkoxysilane-Terminated Polyester Urethane Prepolymer

Step (ii) of the above process involves silanization of the isocyanate terminated polyester urethane prepolymer with an amino-functional alkoxysilane coupling agent to form the alkoxysilane-terminated polyester urethane prepolymer component (A), which can be crosslinked with the separately prepared polysiloxane prepolymer in component (B) to form the PUPSHCC.

In any embodiment of the present invention, the amino-functional alkoxysilane in step (ii) is selected from the group consisting of: an aminoalkyltrialkoxysilane, an aminoaryltrialkoxysilane, an aminoalkyl(alkyl)(dialkoxyl)silane, a [bis(trialkoxylsilyl)-alkyl]amine, an N-(aminoalkyl)-aminoalkyltrialkoxysilane, or an N-alkyltrialkoxylsilyl-N,N-dialkylamine; and preferably wherein the amino-functional alkoxysilane is an aminoalkyltrialkoxysilane.

More preferably, the amino-functional alkoxysilane is selected from the group consisting of 3-aminopropyltrimethoxysilane, 3-aminopropyltriethoxysilane, 4-aminobutyltrimethoxysilane, 4-aminobutyltriethoxy-silane, aminophenyltrimethoxysilane, aminophenyltriethoxysilane, 3-aminopropyl-methyldiethoxysilane, 3-aminopropylmethyldimethoxysilane, bis(trimethoxysilyl-propyl)amine, bis (triethoxysilylpropyl)amine, and N-ethyl-3-trimethoxysilyl-2-methylpropanamine.

3-aminopropyltrimethoxysilane (APTMS) or 3-aminopropyltriethoxysilane (APTES) (available from Gelest or Sigma-Aldrich); and especially 3-aminopropyltrimethoxysilane (APTMS) are particularly preferred amino-functional akoxysilanes for step (ii).

In a preferred embodiment, step (ii) comprises addition of the amino-functional alkoxysilane to the isocyanate-terminated polyester urethane prepolymer. The silanization reaction is typically a fast, spontaneous reaction between the amino functionality of the amino-functional alkoxysilane and the isocyanate terminals of the isocyanate-terminated polyester urethane prepolymer.

Preferably, step (ii) is conducted in the presence of at least one aprotic solvent and a protic solvent preferably as described above. The aprotic solvent may be the same solvent as employed in the reaction mixture in step (i) as described above, with EEP being a particularly preferred aprotic solvent. A protic solvent may be added to the reaction mixture in step (ii). Preferred protic solvents include a hydroxyketone, preferably a β-hydroxyketone, and more preferably diacetone alcohol (DAA). Step (ii) is most preferably carried out in a combination of an aprotic solvent and a protic solvent, preferably in a combination of EEP and DAA.

Step (ii) is preferably conducted at room temperature. The reaction is preferably conducted in an inert atmosphere, preferably under nitrogen.

The silanization reaction between the amino functionalities of the amino-functional alkoxysilane coupling agent and the isocyanate terminals of the isocyanate-terminated polyester urethane prepolymer is typically a fast spontaneous reaction with heat generation and urea linkage formation. The silanization reaction typically is complete within 1 hour and typically generates the alkoxysilane-terminated polyester urethane prepolymer as a clear homogeneous mixture in the aprotic/protic solvent (e.g. EEP/DAA).

Where additives as described above are employed in the compositions of the invention to provide enhanced properties for certain applications of the coating compositions (such as for aircraft transparencies), some of the additives may be added to the reaction mixture for preparing the alkoxysilane-terminated polyester urethane prepolymer in step (ii). In a preferred embodiment, at least one surface active agent which is preferably a surfactant, more preferably a BYK silicone surface additive (modified polydimethylsiloxanes), and most preferably BYK-370 is added to the reaction product of step (ii).

The composition (A) comprising an alkoxysilane-terminated polyester urethane prepolymer typically has a pot life of about 8 to about 12 hours at room temperature in a sealed container.

Silanol Terminated Polysiloxane Prepolymer (B)

In any aspect or embodiment of the present invention, the silanol terminated polysiloxane prepolymer of composition (B) may be obtainable by sol-gel process of an alkoxysilane of formula (II), (III) or (IV):

(II)

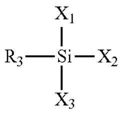

(III)

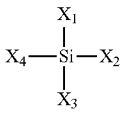

-continued (IV)

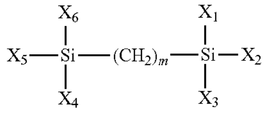

wherein:

$X_1$, $X_2$, $X_3$, $X_4$, $X_5$, and $X_6$ each represents $-OR_3$;

$R_3$ at each occurrence is the same or different, and each is independently selected from an alkyl group; and m represents an integer from 1 to 6.

Preferably $R_3$ is an alkyl group having 1 to 10 carbon atoms, more preferably $R_3$ is an alkyl group having to 1 to 8 carbon atoms, particularly 1 to 6 carbon atoms, and most preferably 1 to 4 carbon atoms.

In preferred embodiments, m represents an integer from 1 to 3.

Preferably in any embodiment of the present invention, each $X_1$, $X_2$, $X_3$, $X_4$, $X_5$, and $X_6$ represents an alkoxy group having 1-6 carbon atoms, more preferably 1-4 carbon atoms and more preferably methoxy or ethoxy.

Representative preferred alkoxysilanes which are suitable for the polysiloxane prepolymer formation of this invention include tetraethyl orthosilicate, tetramethyl orthosilicate, methyltrimethoxysilane, methyltriethoxysilane, ethyltrimethoxysilane, ethyltriethoxysilane, 1,2-bis(triethoxysilyl)ethane, and 1,2-bis(trimethoxysilyl)ethane.

Fully hydrolyzed tetraethyl orthosilicate and tetramethyl orthosilicate have potential to generate 4 silanol functionalities which can participate in the subsequent condensation among themselves or with alkoxysilane-terminated polyester urethane prepolymer for network formation. Fully hydrolyzed methyltrimethoxysilane, methyltriethoxysilane, ethyltrimethoxysilane and ethyltriethoxysilane have potential to generate 3 silanol functionalities which can participate in the subsequent condensation among themselves or with alkoxysilane-terminated polyester urethane prepolymer for network formation. Fully hydrolyzed 1,2-bis(triethoxysilyl)ethane and 1,2-bis(trimethoxysilyl)ethane have potential to generate 6 silanol functionalities which can participate in the subsequent condensation among themselves or with alkoxysilane-terminated polyester urethane prepolymer for network formation. Single alkoxysilane or alkoxysilane combination can be used for the polysiloxane prepolymer preparation. In any embodiment of the present invention, the alkoxysilane is preferably tetramethyl orthosilicate or tetraethyl orthosilicate, and more preferably tetraethyl orthosilicate, which are available from Gelest or Sigma-Aldrich.

The sol-gel process is preferably conducted in an acidified aqueous-organic solvent mixture. The water in the acidified aqueous-organic solvent mixture is to hydrolyze the alkoxysilane and to form the polysiloxane prepolymer. The actual amount of water in the acidified aqueous-organic solvent mixture can vary widely and can be readily determined empirically.

In a preferred embodiment, the silanol terminated polysiloxane prepolymer in composition (B) is obtainable by a process comprising: reacting an alkoxysilane, preferably an alkyltrioxysilane, an alkylorthosilicate or a bis(trialkyloxysilyl)alkane, and more preferably an alkylorthosilicate (particularly TEOS), with at least one acid, in the presence of a solvent comprising an alcohol and water.

The solvent constituent of the acidified aqueous-organic solvent mixture for formation of the silanol terminated polysiloxane prepolymer in composition (B) of the present invention can be any solvent or combination of solvents which is compatible with the alkoxysilanes, their hydrolytes, the formed polysiloxane prepolymer and the alkoxysilane-terminated polyester urethane prepolymer to be compounded with the formed polysiloxane prepolymer.

Representative solvents which are suitable for the polysiloxane prepolymer formation of this invention include alcohols (preferably methanol, ethanol, n-propanol, isopropanol, n-butanol); glycol ethers (preferably ethylene glycol dimethyl ether, propylene glycol dimethyl ether, propylene glycol methyl ether); diacetone alcohol, ketones (preferably methyl ethyl ketone, methyl isobutyl ketone, di-isobutyl ketone), and esters (preferably ethyl acetate, n-propyl acetate, n-butyl acetate, 2-butoxyethyl acetate, and ethyl 3-ethoxypropionate) and combinations thereof. Particularly preferred solvents for the aqueous-organic solvent mixture are alcohols, more preferably wherein the alcohol is selected from a C1-C6 alcohol, particularly a C1-C3 alcohol, and more preferably ethanol.

An organic acid or inorganic acid, or a combination thereof is used to acidify the aqueous-organic solvent mixture and as a catalyst to accelerate hydrolysis of alkoxysilanes for the silanol terminated polysiloxane prepolymer formation. Representative organic or inorganic acids which are suitable for the silanol terminated polysiloxane prepolymer formation of this invention include acetic acid, formic acid, malic acid, succinic acid, malonic acid, hydrochloric acid, nitric acid, sulfuric acid, phosphoric acid, etc.

Preferably, the acid comprises a carboxylic acid and/or a mineral acid, preferably wherein the acid comprises a carboxylic acid and a mineral acid. The carboxylic acid is a C2-C6 alkylcarboxylic acid, preferably acetic acid.

Preferably, the mineral acid is selected from the group consisting of hydrochloric acid, sulfuric acid, nitric acid, hydrobromic acid, hydrofluoric acid, and phosphoric acid, and preferably wherein the mineral acid is hydrochloric acid.

In a particularly preferred embodiment, the polysiloxane prepolymer can be conveniently prepared at room temperature by sol-gel process of the alkoxysilane, preferably tetraethyl orthosilicate (TEOS) in an acetic acid or hydrochloric acid or their combination acidified aqueous-organic solvent mixture.

The process preferably comprises adding the alkoxysilane to a mixture comprising the at least one acid, water and an alcohol.

Preferably the reaction mixture is held at a temperature of: about 15° C. to about 30° C., about 18° C. to about 25° C. or about 20° C. to about 25° C., preferably for: about 8 to about 120 hours, about 12 to about 96 hours, about 20 to about 60 hour, or about 30 to about 50 hours. The reaction mixture is preferably stirred continuously during the reaction time.

The acid is preferably present in an amount to maintain a pH in the range of about 1.5 to about 5, preferably about 1.8 to about 4.5, and more preferably about 2 to about 4. The acid preferably comprises a combination of acetic acid and hydrochloric acid.

Where additives as described above are employed in the compositions of the invention to provide enhanced properties for certain applications of the coating compositions (such as for aircraft transparencies), some of the additives may be added to the reaction mixture for preparing the silanol terminated polysiloxane prepolymer. In a preferred embodiment, at least one antistatic agent (preferably wherein the antistatic agent is a hydrophilic or a hydrophobic antistatic agent, more preferably wherein the antistatic agent is a salt of (bis)trifluoromethanesulfonimide, particularly wherein the antistatic agent is: lithium (bis)trifluoromethanesulfonimide, tri-n-butylmethylammonium bis-(trifluoromethanesulfonyl)imide, or a quaternary alkyl ammonium salt of (bis)trifluoromethanesulfonimide, and most preferably lithium (bis)trifluoromethanesulfonimide) is added to the reaction product.

The composition (B) prepared as described above may be stored in a sealed container for up to about 1 week at room temperature.

Polyurethane-Polysiloxane Hybrid Coating Composition (PUPSHCC)

The PUPSHCC according to the invention is prepared by combining the compositions (A) and (B) of the two-part curable composition as described in any aspect or embodiment herein and curing the composition. The two-part curable composition when combined, forms a curable composition (i.e. a polyurethane-polysiloxane hybrid coating composition precursor), which is thermally curable. The PUPSHCC precursor, may be applied to a substrate, and cured in situ on the substrate to form a coated substrate. The curing process results in the crosslinking of the alkoxysilane-terminated polyester urethane component of composition (A) with the silanol terminated polysiloxane prepolymer component of composition (B).

In a preferred embodiment, the PUPSHCC precursor is prepared by compounding the compositions (A) and (B) of the two-part curable composition as described in any of the aspects and embodiments described herein, optionally with a urethane forming catalyst. The compounding may be carried out by continuous agitation (e.g. in a stainless steel pot). During the compounding step, the mixture is preferably degassed to obtain a homogeneous mixture.

Optionally, a urethane forming catalyst may be added to the mixture to be compounded. The urethane forming catalyst may be the same as the catalyst used for preparing the isocyanate terminated polyester urethane prepolymer as described above. Preferably, the catalyst is selected from the group consisting of dibutyltin dilaurate (DBTDL) or dibutyltin diacetate (DBTDA). However, in some cases, component (A) may include sufficient urethane forming catalyst from the preparation of the isocyanate terminated polyester urethane prepolymer, such that additional catalyst in the mixture to be compounded may not be necessary.

Preferably, to facilitate application of the polyurethane-polysiloxane hybrid coating composition precursor to a substrate, the PUPSHCC precursor has a solids content of about 10 wt % to about 50 wt, and preferably about 20 wt % to about 40 wt % or about 30 wt %.

In order to form the PUPSHCC, the PUPSHCC precursor prepared by the above process is thermally cured, optionally after removal of at least a portion (preferably at least 80 wt %, at least 90 wt %, at least 95 wt %, or at least 98 wt %), of solvent from the PUPSHCC precursor. The solvent may be removed by exposure to air for a sufficient amount of time. Prior to thermal curing, the PUPSHCC precursor is preferably dried to a tack-free consistency.

In preferred embodiments, the thermal curing comprises heating the polyurethane-polysiloxane hybrid prepolymer to a temperature of: about 50° C. to about 82° C., about 60° C. to about 82° C. or about 70° C. to about 82° C.

The present invention further provides a process for preparing a two-part curable coating composition as defined in any aspect or embodiment herein, comprising:

(1) preparing a composition (A) comprising an alkoxysilane-terminated polyester urethane prepolymer, by a process comprising: (i) reacting an aliphatic diisocyanate with a polyester diol to form an isocyanate-terminated polyester urethane prepolymer; and (ii) silanization of the isocyanate-terminated polyester urethane prepolymer with an amino-alkoxysilane;

(2) preparing a composition (B) comprising a silanol terminated polysiloxane prepolymer by sol-gel process of an alkoxysilane with at least one acid, in the presence of a solvent comprising an alcohol and water.

The components (A) and (B) of the two-part curable coating composition as defined in any aspect or embodiment may be compounded and applied to a substrate, and the resulting mixture may be thermally cured to provide a coated substrate.

The present invention further relates to the use of a composition as described herein (i.e. the two-part curable composition, the PUPSHCC and PUPSHCC precursor) as a coating for a substrate, preferably wherein the substrate is selected from the group consisting of an aircraft, a spacecraft, a marine craft or vehicle part, preferably an aircraft part, and more preferably an aircraft transparency, and most preferably an aircraft window or an aircraft windscreens.

Following application of the PUPSHCC precursor to a surface to be coated, the coating is subjected to thermal curing (optionally following solvent removal) to provide a polyurethane-polysiloxane hybrid coating composition which is a crosslinked alkyloxysilane-terminated polyester urethane with the polysiloxane.

The invention further provides a substrate, preferably an aircraft, spacecraft, marine craft or vehicle part, which is coated with a polyurethane-polysiloxane hybrid polymer coating. The substrate is preferably an aircraft part, preferably an aircraft transparency, more preferably an aircraft window or windscreen (windshield).

The invention additionally provides a process for preparing a PUPSHCC coated substrate comprising applying a polyurethane-polysiloxane hybrid coating composition precursor as defined in any embodiment herein, to a surface of the substrate, removing at least a portion of the solvent, and preferably at least 80 wt %, at least 90 wt %, at least 95 wt %, or at least 98 wt %, of the solvent, from the polyurethane-polysiloxane hybrid coating composition precursor, preferably by air drying, and thermally curing the coating composition precursor to provide a substrate coated with a polyurethane-polysiloxane hybrid coating composition.

The PUPSHCC precursor may be cured in situ on the substrate by heating to a temperature of: about 50° C. to about 82° C., about 60° C. to about 82° C. or about 70° C., to about 82° C., for example in an oven.

In preferred embodiments, the substrate is an aircraft transparency, preferably an aircraft window or windshield, and wherein the surface of the substrate comprises an electrically conductive layer, preferably wherein the conductive layer is an indium tin oxide layer, and optionally a silicon binder layer over the conductive layer, onto which the polyurethane-polysiloxane hybrid coating composition precursor is applied.

In a preferred embodiment, the formulation of the PUPSHCC coated substrate comprises:

1) preparing a composition comprising an isocyanate-terminated polyester urethane prepolymer is by reacting an aliphatic diisocyanate and a polyester diol, typically in the presence of a urethane forming catalyst, preferably in the presence of a flow/levelling agent, a UV absorber, a light stabilizer and a thermal stabilizer, and at least one aprotic solvent;

2) converting the isocyanate-terminated polyester urethane prepolymer composition to an alkoxysilane-terminated polyester urethane prepolymer by silanization with an amino-functional alkoxysilane coupling agent to form a composition (A) comprising an alkoxysilane-terminated polyester urethane prepolymer;

3) preparing a composition (B) comprising a silanol terminated polysiloxane prepolymer by sol-gel processing of an alkoxysilane in an acidified aqueous-organic solvent mixture;

4) compounding the compositions (A) and (B) to form a PUPSHCC precursor;

5) coating a substrate (preferably an aircraft transparency) with the PUPSHCC precursor, optionally removing at least a portion of solvent from the PUPSHCC precursor, and 6) thermally curing.

In this process, the alkoxysilane-terminated polyester urethane prepolymer is crosslinked with the silanol terminated polysiloxane prepolymer in the subsequent compounding/flow coating/air drying/thermal curing steps. In the case of an aircraft transparency, the surface typically contains an outer surface electrically conductive indium tin oxide (ITO) or carbon nanotube (CNT) layer. The PUPSHCC precursor is applied to the surface to form a wet topcoat on the ITO or CNT layer. Subsequent drying and thermal curing steps convert the wet topcoat to a durable surface protective coating over the electrically conductive ITO or CNT layer so that a desirable ESD coating system is formed on the outer surface of aircraft transparencies to provide the transparencies with enhanced erosion resistance, abrasion/scratch resistance, electrostatic dissipation capability and environmental durability.

Also provided by the invention is a substrate, preferably an aircraft transparency, and more preferably an aircraft window or an aircraft windshield, obtainable by the process described above.

The present invention describes a PUPSHCC which may be modified with antistatic additives for conductivity promotion, and a package of stabilizers including an UV absorber, a light stabilizer, and a thermal stabilizer for environmental durability enhancement and application of such coating composition as a universal surface protective coating of ESD coating system for transparencies used for modern aircraft to provide the transparencies with enhanced erosion resistance, abrasion/scratch resistance, electrostatic dissipation capability and environmental durability without increase in the coating system complexity and without compromise of any performance properties compared to current state-of-the-art materials.

Surface protective coating formed from the PUPSHCC of this invention inherited the excellent rain erosion resistance from the comparative organic polyurethane and the superior abrasion resistance from the comparative polysiloxane. The preferred embodiments as described in the following illustrative examples 1-7 showed that surface protective coating formed from the optimized PUPSHCC had Taber Abrasion as percent haze increase ΔHz100 in the range of 2-3 which was even superior to the typical result of the comparative polysiloxane while keeping excellent rain erosion resistance as the comparative polyurethane. Surface protective coating formed from the PUPSHCC of this invention also demonstrated the necessary electrostatic dissipation capability. Such surface protective coating is therefore considered suitable as surface protective coating of ESD coating system for transparencies used for modern aircraft to provide the transparencies with enhanced erosion resistance, abrasion/scratch resistance, electrostatic dissipation capability and environmental durability.

Other features and advantages of the invention should become apparent from the following description of the preferred embodiments.

EXAMPLES (1) Substrates for Evaluating the Surface Protective Coating

Aircraft-grade (per MIL-PRF-25690) stretched acrylic sheets of dimension 15"×32" were cleaned with a standard cleaning procedure with cerium oxide, detergent water, tap water, DI water, heptane and IPA in sequence. In Examples 1-4 and 6-7 (i.e. ITO as conductive layer), the cleaned acrylic sheets were first primed with a polyurethane primer and air dried for 2 hours in clean room. The primed acrylic sheets were then flow-coated with a conductive indium tin oxide (ITO) layer, air dried for 1 hour and heated in an air oven at 180° F. for 1 hour. The ITO coated acrylic sheets were then used as substrates for evaluating the transparent PUPSHCC. In Example 5 (CNT as conductive layer), the cleaned acrylic sheets were first flow-coated with a carbon nanotube (CNT) conductive coating and air dried for 1 hour in clean room. The CNT coated acrylic sheets were then capped with a polyurethane layer, air dried for 1 hour and heated in an air oven at 180° F. for 1 hour. The ITO or CNT coated acrylic sheets were then used as substrates for evaluating the transparent PUPSHCC.

(2) Compounding and Application of PUPSHCC

Compounding the sol-gel polysiloxane prepolymer with the alkoxysilane-terminated polyester urethane prepolymer was performed in a stainless steel mixing pot with continuous agitation and degassing. The resulting PUPSHCC precursor is a clear homogeneous coating mixture which can be conveniently flow-coated over the outer surface of aircraft transparencies which contain an outer surface electrically conductive ITO or CNT layer to form a wet topcoat on the ITO or CNT layer. Subsequent air drying and thermal curing steps converted the wet topcoat to a durable transparent surface protective coating over the electrically conductive ITO or CNT layer so that a desirable ESD coating system is formed on the outer surface of aircraft transparencies to provide the transparencies with enhanced erosion resistance, abrasion/scratch resistance, electrostatic dissipation capability and environmental durability.

(3) Performance Highlights Versus State-of-Art Systems

Table 1 highlights typical results of the critical performances of rain erosion resistance, abrasion/scratch resistance, and electrostatic dissipation capability (refer to the section of measurements and performance tests for test methods and procedures) for surface protective coating formed from the PUPSHCC of this invention with surface protective coating formed from the comparative state-of-art systems of the organic polyurethane and sol-gel based polysiloxane.

TABLE 1

Critical Performances for Surface Protective Coating Formed from PUPSHCC of This Invention vs. Comparative State-of-Art Systems

| Coating of the | Rain erosion resistance, 30 min testing | | Taber abrasion ΔHz100, | Electrostatic dissipation capability | | | |
|---|---|---|---|---|---|---|---|
| composition | 381 mph | 480 mph | % | 75° F. | 20° F. | −20° F. | −40° F. |
| PUPSHCC of this invention | Pass | Pass | 2-3 | Pass | Pass | Pass | Pass |
| Comparative polyurethane | Pass | Pass | >5 | Pass | Pass | Pass | Pass |
| Comparative polysiloxane | Fail, scattered surface pitting | Fail, severe surface pitting | ~3 | Pass | Pass | Pass | Pass |

The critical performances showed that surface protective coating formed from the comparative organic polyurethane had excellent rain erosion resistance while having inferior abrasion/scratch resistance. On the other hands, surface protective coating formed from the comparative polysiloxane had superior abrasion/scratch resistance while failing rain erosion resistance with surface pitting on tested samples. Neither of these prior art systems is considered fully satisfactory as surface protective coating of ESD coating system for transparencies used for modern aircraft.

The PUPSHCC of this invention can best be understood and illustrated by reference to the following examples.

Example 1

A) Preparation of Isocyanate-Terminated Polyester Urethane Prepolymer:

Into a stainless steel mixing pot equipped with hot plate, agitator, nitrogen inlet and thermometer were charged with 691.0 g of polyester diol Capa 2085, 344.4 g of methylene bis (4-cyclohexylisocyanate) Desmodur W, 4.2 g of flow/leveling agent Silwet L-77, 6.0 g of antioxidant thermal stabilizer Irganox 1010, 12.0 g of UV absorber Tinuvin 479, 6.0 g of light stabilizer Tinuvin 152 and 0.4 g of 0.5% dibutyltin dilaurate (DBTDL) diluted in aprotic solvent ethyl 3-ethoxypropionate (EEP). The above components were heated to 180° F. and held at this temperature for 2 hours with continuous agitation and nitrogen blanketing. The resulting isocyanate-terminated polyester urethane prepolymer was cooled down to room temperature. 950.0 g of aprotic solvent ethyl 3-ethoxypropionate (EEP) was then added under agitation to dilute the prepolymer as a clear homogeneous mixture with solid content of approximately 53 weight percent. The isocyanate-terminated polyester urethane prepolymer mixture can be stored in a sealed container with pot life up to 3 months.

B) Preparation of Trimethoxysilane-Terminated Polyester Urethane Prepolymer:

The isocyanate-terminated polyester urethane prepolymer mixture prepared in Step (A) was further diluted with 1000.0 g of diacetone alcohol (DAA) with continuous agitation and nitrogen blanketing. 150.0 g of amino-functional alkoxysilane coupling agent 3-aminopropyltrimethoxysilane (APTMS) was added to the urethane prepolymer mixture over a ten minute period to silanize the isocyanate-terminated polyester urethane prepolymer. The silanization between the amino functionalities of APTMS and the isocyanate terminals of the polyester urethane prepolymer is a fast spontaneous reaction with heat generation and urea linkage formation. The silanization reaction completed within 1 hour and generated trimethoxysilane-terminated polyester urethane prepolymer mixture in EEP/DAA. 6.0 g of surface additive BYK-370 was then added in the prepolymer mixture with agitation. The trimethoxysilane-terminated polyester urethane prepolymer had pot life 8-12 hours at room temperature in a sealed container.

C) Preparation of Polysiloxane Prepolymer:

Into a plastic container equipped with lid, stirring plate and magnetic stirring bar were charged with 1021.0 g of ethanol, 112.0 g of DI water, 22.0 g of acetic acid and 2.0 g of hydrochloric acid. The above components were stirred at room temperature for 5 minutes for an acidified aqueous-alcoholic mixture. 320.0 g of tetraethyl orthosilicate (TEOS) was added to the acidified aqueous-alcoholic mixture over a ten minute period with continuous stirring for sol-gel polysiloxane prepolymer formation. The sol-gel process was held for 2 days at room temperature with gentle stirring. 36.0 g of hydrophilic antistatic additive Fluorad HQ 115 was then added. The resulting polysiloxane prepolymer can be stored in a sealed container with pot life up to 1 week at room temperature.

D) Compounding and Flow-Coating of PUPSHCC:

In clean room the trimethoxysilane-terminated polyester urethane prepolymer prepared in Step (B), the polysiloxane prepolymer prepared in Step (C) and 2.0 g of 0.5% dibutyltin dilaurate (DBTDL) diluted in aprotic solvent ethyl 3-ethoxypropionate (EEP) were transferred into a stainless steel mixing pot equipped with agitator and vacuum line for compounding. The compounding was performed for 12 minutes with continuous agitation and degassing. The resulting PUPSHCC precursor was a clear homogeneous mixture with solid content of approximately 30 weight percent. The PUPSHCC precursor had pot life 1-2 hours.

The PUPSHCC precursor was then flow-coated over the previously prepared acrylic sheets of dimension 15"×32" which had an outer surface electrically conductive ITO layer to form a wet topcoat on the ITO layer. Subsequent 2 hours of air drying and 24 hours of 180° F. oven curing steps converted the wet topcoat to a transparent conductive surface protective coating over the electrically conductive ITO layer with coating thickness approximately 34 μm, light transmittance 91.1%, percent haze 0.66, crosshatch adhesion 100%, and Taber Abrasion as percent haze increase ΔHz100=1.95.

Example 2

In this example, all coating materials and processing procedures including isocyanate-terminated polyester urethane prepolymer, trimethoxysilane-terminated polyester urethane prepolymer, polysiloxane prepolymer, compounding and flow-coating of the PUPSHCC procedures were same as those in example 1 except that there was a silicone binder over ITO layer on the acrylic substrate. The resulting transparent conductive surface protective coating over the electrically conductive ITO layer had coating thickness approximately 29 μm, light transmittance 91.2%, percent haze 0.40, crosshatch adhesion 100%, and Taber Abrasion as percent haze increase ΔHz100=2.63.

Example 3

A) Preparation of Isocyanate-Terminated Polyester Urethane Prepolymer:

The isocyanate-terminated polyester urethane prepolymer was prepared as Example 1, Step (A).

B) Preparation of Trimethoxysilane-Terminated Polyester Urethane Prepolymer:

The isocyanate-terminated polyester urethane prepolymer mixture prepared in Step (A) was further diluted with 1400.0 g of diacetone alcohol (DAA) with continuous agitation and nitrogen blanketing. 150.0 g of amino-functional alkoxysilane coupling agent 3-aminopropyltrimethoxysilane (APTMS) was added to the urethane prepolymer mixture over a ten minute period to silanize the isocyanate-terminated polyester urethane prepolymer. The silanization between the amino functionalities of APTMS and the isocyanate terminals of the polyester urethane prepolymer is a fast spontaneous reaction with heat generation and urea linkage formation. The silanization reaction completed within 1 hour and generated trimethoxysilane-terminated polyester urethane prepolymer mixture in EEP/DAA. 6.0 g of surface additive BYK-370 was then added in the prepolymer mixture with agitation. The trimethoxysilane-terminated polyester urethane prepolymer had pot life 8-12 hours at room temperature in a sealed container.

C) Preparation of Polysiloxane Prepolymer:

Into a plastic container equipped with lid, stirring plate and magnetic stirring bar were charged with 621.0 g of ethanol, 112.0 g of DI water, 22.0 g of acetic acid and 2.0 g of hydrochloric acid. The above components were stirred at room temperature for 5 minutes for an acidified aqueous-alcoholic mixture, 320.0 g of tetraethyl orthosilicate (TEOS) was added to the acidified aqueous-alcoholic mixture over a ten minute period with continuous stirring for sol-gel polysiloxane prepolymer formation. The sol-gel process was held for 2 days at room temperature with gentle stirring. 36.0 g of hydrophilic antistatic additive Fluorad HQ 115 was then added. The resulting polysiloxane prepolymer can be stored in a sealed container with pot life up to 1 week at room temperature.

D) Compounding and Flow-Coating of PUPSHCC:

In clean room the trimethoxysilane-terminated polyester urethane prepolymer prepared in Step (B), the polysiloxane prepolymer prepared in Step (C) and 2.0 g of 0.5% dibutyltin dilaurate (DBTDL) diluted in aprotic solvent ethyl 3-ethoxypropionate (EEP) were transferred into a stainless steel mixing pot equipped with agitator and vacuum line for compounding. The compounding was performed for 12 minutes with continuous agitation and degassing. The resulting PUPSHCC precursor was a clear homogeneous mixture with solid content of approximately 30 weight percent. The PUPSHCC precursor had pot life 1-2 hours.

The PUPSHCC precursor was then flow-coated over the previously prepared acrylic sheets of dimension 15"×32" which had an outer surface electrically conductive ITO layer to form a wet topcoat on the ITO layer. Subsequent 2 hours of air drying and 24 hours of 180° F. oven curing steps converted the wet topcoat to a transparent conductive surface protective coating over the electrically conductive ITO layer with coating thickness approximately 31 μm, light transmittance 90.6%, percent haze 0.54, crosshatch adhesion 100%, and Taber Abrasion as percent haze increase ΔHz100=2.71.

Example 4

In this example, all coating materials and processing procedures including isocyanate-terminated polyester urethane prepolymer, trimethoxysilane-terminated polyester urethane prepolymer, polysiloxane prepolymer, compounding and flow-coating of the PUPSHCC procedures were same as those in example 3 except that there was a silicone binder over ITO layer on the acrylic substrate. The resulting transparent conductive surface protective coating over the electrically conductive ITO layer had coating thickness approximately 31 μm, light transmittance 90.8%, percent haze 0.52, crosshatch adhesion 100%, and Taber Abrasion as percent haze increase ΔHz100=2.66.

Example 5

A) Preparation of Isocyanate-Terminated Polyester Urethane Prepolymer:

Into a stainless steel mixing pot equipped with hot plate, agitator, nitrogen inlet and thermometer were charged with 691.0 g of polyester diol Capa 2085, 344.4 g of methylene bis (4-cyclohexylisocyanate) Desmodur W, 4.2 g of flow/leveling agent Silwet L-77, 6.0 g of antioxidant thermal stabilizer Irganox 1010, 12.0 g of UV absorber Tinuvin 479, 6.0 g of light stabilizer Tinuvin 152 and 0.4 g of 0.5% dibutyltin diacetate (DBTDA) diluted in aprotic solvent ethyl 3-ethoxypropionate (EEP). The above components were heated to 180° F. and held at this temperature for 2 hours with continuous agitation and nitrogen blanketing. The resulting isocyanate-terminated polyester urethane prepolymer was cooled down to room temperature. 950.0 g of aprotic solvent ethyl 3-ethoxypropionate (EEP) was then added under agitation to dilute the prepolymer as a clear homogeneous mixture with solid content of approximately 53 weight percent. The isocyanate-terminated polyester urethane prepolymer mixture can be stored in a sealed container with pot life up to 3 months.

B) Preparation of Trimethoxysilane-Terminated Polyester Urethane Prepolymer:

The isocyanate-terminated polyester urethane prepolymer mixture prepared in Step (A) was further diluted with 1400.0 g of diacetone alcohol (DAA) with continuous agitation and nitrogen blanketing. 150.0 g of amino-functional alkoxysilane coupling agent 3-aminopropyltrimethoxysilane (APTMS) was added to the urethane prepolymer mixture over a ten minute period to silanize the isocyanate-terminated polyester urethane prepolymer. The silanization between the amino functionalities of APTMS and the isocyanate terminals of the polyester urethane prepolymer is a fast spontaneous reaction with heat generation and urea linkage formation. The silanization reaction completed within 1 hour and generated trimethoxysilane-terminated polyester urethane prepolymer mixture in EEP/DAA. 6.0 g of surface additive BYK-370 was then added in the prepolymer mixture with agitation. The trimethoxysilane-terminated polyester urethane prepolymer had pot life 8-12 hours at room temperature in a sealed container.

C) Preparation of Polysiloxane Prepolymer

Into a plastic container equipped with lid, stirring plate and magnetic stirring bar were charged with 621.0 g of ethanol, 112.0 g of DI water, 22.0 g of acetic acid and 2.0 g of hydrochloric acid. The above components were stirred at room temperature for 5 minutes for an acidified aqueous-alcoholic mixture. 320.0 g of tetraethyl orthosilicate (TEOS) was added to the acidified aqueous-alcoholic mixture over a ten minute period with continuous stirring for sol-gel polysiloxane prepolymer formation. The sol-gel process was held for 2 days at room temperature with gentle stirring. 36.0 g of hydrophilic antistatic additive Fluorad HQ 115 was then added. The resulting polysiloxane prepolymer can be stored in a sealed container with pot life up to 1 week at room temperature.

D) Compounding and Flow-Coating of PUPSHCC:

In clean room the trimethoxysilane-terminated polyester urethane prepolymer prepared in Step (B), the polysiloxane prepolymer prepared in Step (C) and 2.0 g of 0.5% dibutyltin diacetate (DBTDA) diluted in aprotic solvent ethyl 3-ethoxypropionate (EEP) were transferred into a stainless steel mixing pot equipped with agitator and vacuum line for compounding. The compounding was performed for 12 minutes with continuous agitation and degassing. The resulting PUPSHCC precursor was a clear homogeneous mixture with solid content of approximately 30 weight percent. The PUPSHCC precursor had pot life 1-2 hours.

The PUPSHCC precursor was then flow-coated over the previously prepared acrylic sheets of dimension 15"×32" which had air outer surface electrically conductive CNT layer to form a wet topcoat on the CNT layer. Subsequent 2 hours of air drying and 24 hours of 180° F. oven curing steps converted the wet topcoat to a transparent conductive surface protective coating over the electrically conductive CNT layer with coating thickness approximately 37 μm, light transmittance 90.9%, percent haze 0.75, crosshatch adhesion 100%, and Taber Abrasion as percent haze increase ΔHz100=2.74.

Example 6

(Comparative Polyurethane Composition)

An aliphatic polyester urethane composition with GKN code 557008 was flow-coated over previously prepared acrylic sheet of dimension 15"×32" which had an outer surface electrically conductive ITO layer to form a wet topcoat on the ITO layer. The coated acrylic sheet was then air dried and oven cured according to the process sheet. The resulting transparent surface protective coating over the electrically conductive ITO layer had coating thickness 74 μm, light transmittance 90.7%, percent haze 0.65, crosshatch adhesion 100%, and Taber Abrasion as percent haze increase ΔHz100=5.51.

Example 7

(Comparative Polysiloxane Composition)

A polysiloxane composition obtained from SDC Technologies with GKN code SS6782 was flow-coated over previously prepared acrylic sheet of dimension 15"×32" which had an outer surface electrically conductive ITO layer to form a wet topcoat on the ITO layer. The coated acrylic sheet was then air dried and oven cured according to the process sheet. The resulting transparent surface protective coating over the electrically conductive ITO layer had coating thickness 4.45 μm, light transmittance 92.6%, percent haze 0.50, crosshatch adhesion 100%, and Taber Abrasion as percent haze increase ΔHz100=3.07.

Measurements and Performance Tests:

1) Routine Measurements:

Coating thickness of the surface protective coating over the electrically conductive ITO layer was measured with QuintSonic Thickness Gauge. Light transmittance and percent haze were measured with Gardner haze-gard according to ASTM D-1003. Crosshatch adhesion was measured according to ASTM D-3359.

2) Taber Abrasion as Abrasion Resistance:

Abrasion resistance of the coated acrylics was tested as Taber Abrasion according to ASTM D-1044 using a Taber Abrader with CS-10F grinding wheels and 500 g/arm by abrading a sample of the coated acrylics of approximately 4 inches by 4 inches. Percent haze increases in the wear pattern were measured for 100 cycles and showed as ΔHz100, %.

3) Electrostatic Dissipation Capability Testing:

Electrostatic dissipation capability testing of the coated acrylics was carried out at 75° F. 20° F., −20° F., and −40° F. using the method described in ASTM D-257. The coated acrylic sheet of dimension 15"×32" was first painted with a silver electrode 1.0 square foot (12"×12") on surface in the bottom area. The silver electrode painted acrylic sheet was then put in a temperature controlled chamber and the surface electrode and the underneath ITO conductive layer were connected to an electric power supplier for recording the relationship of current density and applied voltage at various temperatures. The applied voltages for setting current densities 80 μA/sq. ft. at 75° F., 40 μA/sq. ft. at 20° F., 20 μA/sq. ft. at −20° F. and 20 μA/sq. ft. at −40° F. were measured in the range of 50 V to 3,000 V without dielectric breakdown for surface protective coating formed from the PUPSHCC of this invention. The surface protective coating with such electrostatic dissipation capability is sufficiently conductive to allow the charge on the surface to drain through the thickness of the surface protective coating to the underlying grounded ITO conductive layer thus it can be used satisfactorily as surface protective coating of ESD coating system for transparencies used for modern aircraft where static dissipative properties are required.

4) Rain Erosion Testing:

Specimen of the coated acrylics were tested rain erosion resistance. The coated acrylics were first cut into 1.00"×1.00"×0.25" dimension then step machined across upper edge, filled with gray elastomeric material flush to remaining sample surface of 3/32" thick×3/16" wide to fit with the tester holder. Rain erosion test parameters are 30 degree impact angle, one inch per hour rainfall and test velocity 381 and 480 miles per hour. Average rain drop size is 2.0 mm. Test specimen were inspected initial and after 30 min exposure to the rainfall for topcoat delamination or damage. Less than 10% coating loss or delamination or damage after test is viewed as pass.

5) Accelerated QUV Exposure:

Samples of the coated acrylics were tested light transmittance, percent haze, crosshatch adhesion, and overall appearance with accelerated QUV exposure for up to 5 weeks. The accelerated QUV equipment was operated in a cycle of 50° C. 7 hours UV exposure and 50° C./5 hours condensation (UV off, high humidity) with UVB-313 EL Fluorescent Lamps. Testing samples were removed from the QUV equipment weekly to check percent light transmission, percent haze, percent adhesion, and overall appearance. Percent light transmittance and percent haze are measured according to ASTM D-1003. Percent adhesion is measured according to ASTM D-3359. The surface protective coating formed from PUPSHCC exhibited substantially no degradation in light transmission, percent haze, percent adhesion, and overall appearance during the QUV exposure and shows excellent environmental durability against the detrimental effects of light and weathering.

Further aspects and embodiments of the present invention are set out in the following numbered clauses:

1. A two-part curable coating composition comprising:

(A) a composition comprising an alkoxysilane terminated polyester urethane prepolymer, comprising a prepolymer chain having a terminal group of general formula (I):

(I)

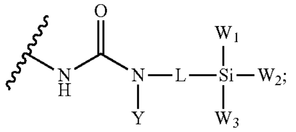

wherein:

Y represents: H; $R_1$ wherein $R_1$ represents hydrocarbyl preferably alkyl or aryl; or wherein Y represents the group:

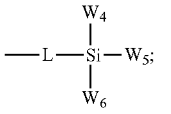

L represents a hydrocarbylene group, preferably an alkylene or an arylene group, preferably a $C_1$ to $C_{10}$ hydrocarbylene group, and preferably methylene, ethylene, or propylene and most preferably propylene;

$W_1$, $W_2$, $W_3$, $W_4$, $W_5$ and $W_6$ may be the same or different and each independently represents —$OR_2$, wherein $R_2$ at each occurrence may be the same or different, and each $R_2$ is independently selected from an alkyl group, preferably wherein the alkyl group has 1 to 10 carbon atoms, and preferably wherein the alkyl group has 1 to 8 atoms, preferably methyl or ethyl, and most preferably methyl;

and (B) a composition comprising a silanol terminated polysiloxane prepolymer obtainable by sol-gel process of an alkoxysilane selected from a compound of general formula (II), (III) or (IV):

(II)

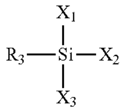

(III)

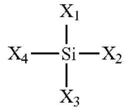

(IV)

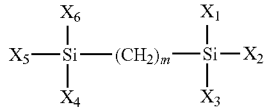

wherein:

$X_1$, $X_2$, $X_3$, $X_4$, $X_5$, and $X_6$ each represents —$OR_3$;

$R_3$ at each occurrence is the same or different, and each is independently selected from an alkyl group, preferably wherein the alkyl group has 1 to 10 carbon atoms, 1 to 8 atoms, 1 to 6 carbon atoms, and most preferably 1 to 4 carbon atoms; and m represents an integer from 1 to 6, preferably 1 to 3.

2. A composition according to Clause 1 wherein the compositions (A) and/or (B) include at least one or more of the following: solvent; urethane forming catalyst; antistatic agent; stabilizer selected from one or more of a UV absorber, light stabilizer and thermal stabilizer; and surface active agent selected from one or more of a flow or levelling agent and surfactant; preferably wherein composition (A) comprises at least one solvent, a flow or levelling agent, at least one stabilizer, a urethane forming catalyst and a surface additive and wherein composition (B) comprises at least one solvent, and an antistatic additive.

3. A composition according to Clause 1 or Clause 2, wherein $R_1$ at each occurrence is the same or different, and each is independently selected from: a $C_1$ to $C_6$ alkyl, or a $C_1$ to $C_4$ alkyl group; and preferably wherein $R_1$ at each occurrence is the same and each represents a $C_1$ to $C_6$ alkyl, or a $C_1$ to $C_4$ alkyl group, and preferably a methyl or ethyl group.

4. A composition according to any of Clauses 1 to 3 wherein Y is H.

5. A composition according to any of Clauses 1 to 4 comprising at least one solvent, preferably comprising two or more solvents, preferably wherein the solvent comprises an aprotic solvent and a protic solvent, preferably wherein the aprotic solvent is selected from the group consisting of ethyl 3-ethoxypropionate (EEP), n-pentyl propionate (nPP), 2-butoxyethyl acetate (BEA), di-isobutyl ketone (DIBK), and methyl isobutyl ketone (MIBK), or a combination thereof, and/or the protic solvent is a hydroxyketone, preferably a β-hydroxyketone, and more preferably diacetone alcohol (DAA); preferably wherein the composition (A) comprises a mixture of an alkoxysilane terminated polyester urethane prepolymer in ethyl 3-ethoxypropionate and diacetone alcohol.

6. A composition according to any of Clauses 1 to 5 comprising a urethane forming catalyst, preferably wherein the urethane forming catalyst is selected from the group consisting of: dibutyltin dilaurate (DBTDL) or dibutyltin diacetate (DBTDA).

7. A composition according to any of Clauses 1 to 6, comprising a urethane forming catalyst in an amount of about 0.1 ppm to about 100 ppm, and preferably about 1 ppm to about 10 ppm, based on the total weight of solids in the composition.

8. A composition according to any of Clauses 1 to 7 comprising a UV absorber, preferably selected from a hydroxyphenyl-triazine, hydroxyphenyl-benzotriazole or hydroxyphenyl-benzophenone UV absorber; more preferably wherein the UV absorber is selected from:

a mixture of 2-[4-[2-Hydroxy-3-tridecyloxypropyl]oxy]-2-hydroxyphenyl]-4,6-bis(2,4-dimethylphenyl)-1,3,5-triazine and 2-[4-[2-hydroxy-3-didecyloxypropyl]oxy]-2-hydroxyphenyl]-4,6-bis(2,4-dimethylphenyl)-1,3,5-triazine (Tinuvin 400);

[2-hydroxy-4-[3-(2-ethylhexyl-1-oxy)-2-hydroxypropyloxy]phenyl]-4,6bis(2,4-dimethylphenyl)-1,3,5-triazine) (Tinuvin 405);

2,4-bis(2-hydroxy-4-butoxyphenyl)-6-(2,4-dibutoxyphenyl)-1,3,5-triazine (Tinuvin 460);

2-hydroxyphenyl-s-triazine with 18-20% 2-methoxy-1-propyl-acetate (Tinuvin 477);

6-methylheptyl 2-[4-[4,6-bis(4-phenylphenyl)-1H-1,3,5-triazin-2-ylidene]-3-oxocyclohexa-1,5-dien-1-yl]oxypropanoate (Tinuvin 479)

2-(2H-benzotriazol-2-yl)-6-(1-methyl-1-phenylethyl)-4-(1,1,3,3-tetramethylbutyl)phenol (Tinuvin 928);

a mixture of: a) 50% b-[3-(2-H-Benzotriazole-2-yl)-4-hydroxy-5-tert.butylphenyl]-propionic acidpoly(ethylene glycol) 300-ester and b) 50% Bis{b-[3-(2-H-Benzotriazole-2-yl)-4-hydroxy-5-tert.butylphenyl]-propionic acid}-poly(ethylene glycol) 300-ester (Tinuvin 1130);

2-(benzotriazol-2-yl)-4,6-bis(2-methylbutan-2-yl)phenol (Tinuvin 328);

a mixture of 95% Benzenepropanoic acid, 3-(2H-benzotriazol-2-yl)-5-(1,1-dimethylethyl)-4-hydroxy-, $C_{7-9}$-branched and linear alkyl esters and 5% 2-Propanol, 1-methoxy-, 2-acetate (Tinuvin 99-2), and a mixture of 95% Benzenepropanoic acid, 3-(2H-benzotriazol-2-yl)-5-(1,1-dimethylethyl)-4-hydroxy-, C7-9-branched and linear alkyl esters and 5% 1-methoxy-2-propyl acetate (Tinuvin 384-2).

9. A composition according to any of Clauses 1 to 8 comprising a light absorber, preferably wherein the light absorber is a hindered amine light stabilizer (HALS), more preferably selected from:

decanedioic acid, bis (2,2,6,6-tetramethyl-1-(octyloxy)-4-piperidinyl) ester (Tinuvin 123);

bis(1,2,2,6,6-pentamethyl-4-piperidinyl)-[[3,5-bis(1,1-dimethylethyl)-4-hydroxyphenyl]methyl]butylmalonate (Tinuvin 144);

2,4-bis[N-butyl-N-(1-cyclohexyloxy-2,2,6,6-tetramethylpiperidin-4-yl)amino]-6-(2-hydroxyethylarnine)-1,3,5-triazine (Tinuvin 152);

mixture of bis(1,2,2,8,6-pentamethyl-4-piperidinyl)sebacate (75-85%) and methyl 1,2,2,6,6-pentamethyl-4-piperidyl sebacate (15-25%) (Tinuvin 292); or a liquid, non-basic amino-ether (NOR) non-interacting hindered amine light stabilizer (Tinuvin 5100);

and preferably wherein the light absorber is 2,4-bis[N-butyl-N-(1-cyclohexyloxy-2,2,6,6-tetramethylpiperidin-4-yl)amino]-6-(2-hydroxyethylamine)-1,3,5-triazine.

10. A composition according to any of Clauses 1 to 9 comprising a thermal stabilizer, preferably wherein the thermal stabilizer is a sterically hindered phenolic antioxidant, preferably selected from the group consisting of: pentaerythritol tetrakis(3-(3,5-di-tert-butyl-4-hydroxyphenyl)propionate); octadecyl 3-(3,5-di-tert-butyl-4-hydroxyphenyl)propionate; benzenepropanoic acid, 3,5-bis(1,1-dimethylethyl)-4-hydroxy-, C7-9-branched alkyl esters; and triethylene glycol bis(3-tert-butyl-4-hydroxy-5-methylphenyl)propionate; and more preferably wherein the thermal stabilizer is pentaerythritol tetrakis(3-(3,5-di-tert-butyl-4-hydroxyphenyl)propionate).

11. A composition according to any of Clauses 1 to 10, comprising an antistatic agent, preferably wherein the antistatic agent is a hydrophilic or a hydrophobic antistatic agent, more preferably wherein the antistatic agent is a salt of (bis)trifluoromethane-sulfonimide, particularly wherein the antistatic agent is: lithium (bis)trifluoromethanesulfonimide, tri-n-butylmethylammonium bis-(trifluoromethanesulfonyl)-imide, or a quaternary alkyl ammonium salt of (bis)trifluoromethane-sulfonimide, and particularly preferably lithium (bis)trifluoromethanesulfonimide.

12. A composition according to any of Clauses 1 to 11 wherein the antistatic additive is present in the range of 1 to 5 weight percent, and preferably in the range of 2 to 3 weight percent, based on the total weight of solids in the composition.

13. A composition according to any of Clauses 1 to 12 comprising a stabilizer combination comprising: a UV absorber, a light absorber and a thermal stabilizer, and preferably wherein the composition comprises a stabilizer combination of: 6-methylheptyl 2-[4-[4,6-bis(4-phenylphenyl)-1H-1,3,5-triazin-2-ylidene]-3-oxocyclohexa-1,5-dien-1-yl]oxypropanoate (Tinuvin 479), 2,4-bis[N-butyl-N-(1-cyclohexyloxy-2,2,6,6-tetramethylpiperidin-4-yl)amino]-6-(2-hydroxyethylamine)-1,3,5-triazine (Tinuvin 152) and pentaerythritol tetrakis(3-(3,5-di-tert-butyl-4-hydroxyphenyl)propionate) (IRGANOX 1010).

14. A composition according to any of Clauses 1 to 13, comprising one or more stabilizers in a total amount of about 0.5 wt % to about 4 wt %, and preferably about 1 wt % to about 3 wt %, based on the total weight of solids in the two part curable composition.

15. A composition according to any of Clauses 1 to 14 comprising a flow or levelling agent, preferably wherein the flow or levelling agent is a silicone-based flow or levelling agent, particularly a modified siloxane silicone based flow or levelling agent and more preferably wherein the flow or levelling agent is selected from the group consisting of: polyethylene glycol mono(3-(tetramethyl-1-(trimethylsiloxy)disiloxanyl)propyl)ether (Silwet L-77), a mixture of siloxane polyalkyleneoxide copolymer and octamethylcyclotetrasiloxane (Silwet L-7200); an organosilicone of the polyalkyleneoxide modified polydimethylsiloxane (Silwet L-7600); an organosilicone surface tension reducing agent with siloxane polyalkyleneoxide copolymer and octamethylcyclotetrasiloxane (Silwet L-7604); a polyether silicone of polyalkyleneoxide modified polydimethylsiloxane (Silwet L-7605); and an organosilicone surface tension reducing agent with a polyalkyleneoxide modified polydimethylsiloxane (Silwet L-7657); and preferably wherein the flow or levelling agent is polyethylene glycol mono(3-(tetramethyl-1-(trimethylsiloxy)disiloxanyl)propyl)ether.

16. A composition according to any of Clauses 1 to 15 comprising a surfactant, preferably wherein the surfactant is a silicone based surface additive, preferably wherein the surfactant is a polyether modified polydimethylsiloxane (particularly BYK-300, BYK-306, BYK-313, and BYK-378); or a polyester-modified polydimethylsiloxane (particularly BYK-333 and BYK-370).

17. A composition according to any of Clauses 1 to 16 comprising a flow or levelling agent which is polyethylene glycol mono(3-(tetramethyl-1-(trimethylsiloxy)disiloxanyl) propyl)ether (Silwet L-77), and a surfactant which is a polyester modified hydroxyl functional polydimethylsiloxane (BYK-370).

18. A composition according to any of Clauses 1 to 17, comprising one or more or a flow or levelling agent or surface active agents wherein each flow or levelling agent or surface active agent is present in an amount of about 0.05 wt % to about 1 wt %, and preferably about 0.1 wt % to about 0.5 wt %, based on the total weight of solids in the two part composition.

19. A composition according to any of Clauses 1 to 18, wherein the alkoxysilane-terminated polyester urethane prepolymer in composition (A) is obtainable by a process comprising:

(i) reacting an aliphatic diisocyanate with a polyester diol to form an isocyanate-terminated polyester urethane prepolymer; and (ii) silanization of the isocyanate-terminated polyester urethane prepolymer with an amino-functional alkoxysilane to form an alkoxysilane-terminated polyester urethane prepolymer.

20. A composition according to Clause 19, wherein the aliphatic diisocyanate in step (i) is a monomeric aliphatic diisocyanate, or a monomeric cycloaliphatic diisocyanate, preferably selected from: hexamethylene diisocyanate, methylene bis (4-cyclohexylisocyanate), and isophorone diisocyanate, and more preferably methylene bis (4-cyclohexylisocyanate).

21. A composition according to Clause 19 or Clause 20, wherein the polyester diol is a polycaprolactone-based polyester diol, preferably a linear polyester diol derived from caprolactone monomer which is terminated by primary hydroxyl groups, more preferably wherein the polyester diol is obtainable by catalytic ring-opening polymerization of caprolactone monomer in the presence of a diol initiator, preferably wherein the diol initiator is alkylenediol or an dialkyleneglycol initiator, and most preferably wherein the diol initiator is selected from the group consisting of 1,4-butanediol (BDO), diethylene glycol (DEG) and neopentyl glycol (NEO), and particularly diethylene glycol.

22. A composition according to any of Clauses 19 to 21, wherein the polyester diol has a molecular weight of about 300 g/mol to about 5000 g/mol, preferably about 380 g/mol to about 4500 g/mol, or about 600 g/mol to about 1000 g/mol, or particularly about 700 g/mol to about 900 g/mol, and especially about 800 g/mol to about 850 g/mol.

23. A composition according to any of Clauses 18 to 22, wherein the polyester diol is obtainable by catalytic ring-opening polymerization of caprolactone in the presence of 1,4-butanediol initiator, preferably having a molecular weight of about 700 g/mol to about 900 g/mol.

24. A composition according to any of Clauses 19 to 23, wherein the molar ratio of the polyester diol to aliphatic diisocyanate in step (i) is from: about 1:1.1 to about 1:5, about 1:1.1 to about 1:4, about 1:1.1 to about 1:2, about 1:1.3 to about 1:1.7, or about 1:1.6.

25. A composition according to any of Clauses 19 to 24, wherein step (i) is carried out in the presence of a urethane forming catalyst, preferably wherein the catalyst is selected from the group consisting of dibutyltin dilaurate (DBTDL) or dibutyltin diacetate (DBTDA).

26. A composition according to any of Clauses 19 to 25, wherein the reaction mixture in step (i) further comprises at least one additive selected from the group consisting of: one or more stabilizers preferably a UV absorber, a light stabilizer and a thermal stabilizer preferably as defined in any of Clauses 8-10; and a flow/levelling agent preferably as defined in Clause 15.

27. A composition according to any of Clauses 19 to 26, wherein step (i) is carried out at a temperature of: about 50° C. to about 120° C., or about 60° C. to about 100° C., or about 70° C. to about 90° C.

28. A composition according to any of Clauses 19 to 27, wherein the reaction time in step (i) is about 1 to about 4 hours, or preferably about 1 to about 3 hours.

29. A composition according to any of Clauses 19 to 28, wherein step (i) further comprises adding an aprotic solvent to the isocyanate-terminated polyester urethane prepolymer to form a homogeneous mixture having a solid content of about 20 to about 80 wt %, preferably about 30 to about 70 wt %, more preferably about 40 to about 60 wt %.

30. A composition according to Clause 29, wherein the aprotic solvent is selected from the group consisting of: ethyl 3-ethoxypropionate (EEP), n-pentyl propionate (nPP), 2-butoxyethyl acetate (BEA), di-isobutyl ketone (DIBK), and methyl isobutyl ketone (MIBK), and more preferably 3-ethoxypropionate (EEP).

31. A composition according to any of Clauses 19 to 30, wherein the amino-functional alkoxysilane in step (ii) is selected from the group consisting of: an aminoalkyltrialkoxysilane, an aminoaryltrialkoxysilane, an aminoalkyl (alkyl)(dialkoxyl)silane, a [bis(trialkoxylsilyl)-alkyl]amine, an N-(aminoalkyl)-aminoalkyltrialkoxysilane, or an N-alkyltrialkoxylsilyl-N,N-dialkylamine; and preferably wherein the amino-functional alkoxysilane is an aminoalkyltrialkoxysilane, preferably wherein the amino-functional alkoxysilane is selected from the group consisting of 3-aminopropyltrimethoxysilane, 3-aminopropyltriethoxysilane, 4-aminobutyltrimethoxysilane, 4-aminobutyltriethoxy-silane, aminophenyltrimethoxysilane, aminophenyltriethoxysilane, 3-aminopropyl-methyldiethoxysilane, 3-aminopropylmethyldimethoxysilane, bis(trimethoxysilyl-propyl) amine, bis(triethoxysilylpropyl)amine, N-ethyl-3-trimethoxysilyl-2-methylpropanamine; more preferably 3-aminopropyltrimethoxysilane (APTMS) or 3-aminopropyltriethoxysilane (APTES); and most preferably 3-aminopropyltrimethoxysilane (APTMS).

32. A composition according to any of Clauses 19 to 31, wherein step (ii) comprises addition of the amino-functional alkoxysilane to the isocyanate-terminated polyester urethane prepolymer.

33. A composition according to any of Clauses 19 to 32, wherein step (ii) is conducted in the presence of at least one aprotic solvent preferably as defined in Clause 30, and optionally additionally in the presence of a protic solvent in which the isocyanate-terminated polyester urethane prepolymer and the amino-functional alkoxysilane is soluble.

34. A composition according to Clause 33, wherein the protic solvent is a hydroxyketone, more preferably a β-hydroxyketone, and particularly diacetone alcohol (DAA).

35. A composition according to any of Clauses 19 to 34, wherein step (i) and/or step (ii), and preferably both, are conducted in an inert atmosphere, preferably under nitrogen.

36. A composition according to any of Clauses 19 to 35, wherein step (ii) further comprises adding at least one surfactant to the alkoxysilane-terminated polyester urethane prepolymer, preferably wherein the surfactant is as defined in Clause 16.

37. A composition according to any of Clauses 1 to 36, wherein the silanol terminated polysiloxane prepolymer (B) is obtainable by sol-gel process of an alkyltrioxysilane, an alkylorthosilicate or a bis(trialkyloxysilyl)alkane, preferably an alkylorthosilicate; preferably wherein the silanol terminated polysiloxane prepolymer (B) is obtainable by sol-gel process of an alkoxysilane selected from the group consisting of: tetraethyl orthosilicate, tetramethyl orthosilicate, methyltrimethoxysilane, methyltriethoxysilane, ethyltrimethoxysilane, ethyltriethoxysilane, 1,2-bis(triethoxysilyl)ethane, and 1,2-bis(trimethoxysilyl)ethane; and more preferably tetraethyl orthosilicate.

38. A composition according to any of Clauses 1 to 37, wherein the silanol terminated polysiloxane prepolymer in composition (B) is obtainable by a process comprising: reacting an alkoxysilane, preferably an alkyltrioxysilane, an alkylorthosilicate or a bis(trialkyloxysilyl)alkane, and more preferably an alkylorthosilicate, with at least one acid, in the presence of a solvent comprising an alcohol and water.

39. A composition according to Clause 38, wherein the process comprises adding the alkoxysilane to a mixture comprising the at least one acid, water and an alcohol.

40. A composition according to Clause 38 or Clause 39, wherein the reaction mixture in step (a) is held at a temperature of: about 15° C. to about 30° C., about 18° C. to about 25° C. or about 20° C. to about 25° C. preferably for: about 8 to about 120 hours, about 12 to about 96 hours, about 20 to about 60 hour, or about 30 to about 50 hours.

41. A composition according to any of Clauses 38 to 40, wherein the acid comprises a carboxylic acid and/or a mineral acid, preferably wherein the acid comprises a carboxylic acid and a mineral acid.

42. A composition according to Clause 41, wherein the carboxylic acid is a C2-C6 alkylcarboxylic acid, preferably acetic acid.

43. A composition according to Clause 41 or Clause 42, wherein the mineral acid is selected from the group consisting of hydrochloric acid, sulfuric acid, nitric acid, hydrobromic acid, hydrofluoric acid, and phosphoric acid, and preferably wherein the mineral acid is hydrochloric acid.

44. A composition according to any of Clauses 38 to 43, wherein the acid is present in an amount to maintain a pH in the range of about 1.5 to about 5, preferably about 1.8 to about 4.5, and more preferably about 2 to about 4.

45. A composition according to any of Clauses 38 to 44, wherein the acid comprises acetic acid and hydrochloric acid.

46. A composition according to any of Clauses 38 to 45, wherein the alcohol is selected from a C1-C6 alcohol, preferably a C1-C3 alcohol, and more preferably ethanol.

47. A composition according to any of Clauses 37 to 46, further comprising adding an antistatic agent to the silanol terminated polysiloxane prepolymer, preferably wherein the antistatic agent is as defined in any of Clauses 11 or 12.

48. A composition according to any of Clauses 19 to 47, wherein the molar ratio of the amino-functional alkoxysilane in step (ii) to the alkoxysilane in composition (B) is about 1:4 to about 4:1, preferably about 1:3 to about 3:1, and more preferably about 1:2 to about 1:3.

49. A composition according to any of Clauses 1 to 48 which is thermally curable, preferably in the presence of a catalyst, more preferably wherein the catalyst is selected from the group consisting of: dibutyltin dilaurate (DBTDL) or dibutyltin diacetate (DBTDA).

50. A polyurethane-polysiloxane hybrid coating composition (PUPSHCC) precursor which is obtainable by a process comprising compounding composition (A) and composition (B) of the two-pad curable composition as defined in any of Clauses 1 to 49, optionally with a urethane forming catalyst.

51. A polyurethane-polysiloxane hybrid coating composition precursor according to Clause 50, wherein the compounding comprises combining the compositions (A) and (B) and optionally a urethane forming catalyst, by agitation, preferably with degassing, to obtain a homogeneous mixture.

52. A polyurethane-polysiloxane hybrid coating composition precursor according to Clause 51, wherein the compounding is carried out in the presence of a catalyst selected from the group consisting of dibutyltin dilaurate (DBTDL) or dibutyltin diacetate (DBTDA).

53. A polyurethane-polysiloxane hybrid coating composition precursor according to any of Clauses 50 to 52, having a solids content of about 10 wt % to about 50 wt, and preferably about 20 wt % to about 40 wt % or about 30 wt %.

54. A polyurethane-polysiloxane hybrid coating composition which is obtainable by a process comprising removing at least a portion of solvent, and preferably at least 80 wt %, at least 90 wt %, at least 95 wt %, or at least 98 wt % of the solvent, from the polyurethane-polysiloxane hybrid coating composition precursor of any of Clauses 50 to 53, preferably by air drying, and subjecting the PUPSHCC precursor to thermal curing.

55. A polyurethane-polysiloxane hybrid coating composition according to Clause 54, wherein the thermal curing comprises heating the polyurethane-polysiloxane hybrid coating composition precursor to a temperature of: about 50° C. to about 82° C. about 60° C. to about 82° C. or about 70° C. to about 82° C.

56. A process for preparing a two-part curable coating composition as defined in any of Clauses 1 to 49, comprising:

(1) preparing composition (A) comprising an alkoxysilane-terminated polyester urethane prepolymer by a process comprising: (i) reacting an aliphatic diisocyanate with a polyester diol to form an isocyanate-terminated polyester urethane prepolymer; and (ii) silanization of the isocyanate-terminated polyester urethane prepolymer with an amino-alkoxysilane according to any of Clauses 20 to 36; and (2) preparing a silanol terminated polysiloxane prepolymer (B) by sol-gel process of an alkoxysilane with at least one acid, in the presence of a solvent comprising an alcohol and water, according to any of Clauses 37 to 48.

57. Use of a composition according to any of Clauses 1 to 55 as a coating for a substrate, preferably wherein the substrate is selected from the group consisting of an aircraft, a spacecraft, a marine craft or vehicle part, preferably an aircraft part, and more preferably an aircraft transparency, and most preferably an aircraft window or an aircraft windscreens.

58. Use according to Clause 57 wherein the coating is subjected to thermal curing to provide a polyurethane-polysiloxane hybrid coating composition which is a cross-linked alkyloxysilane-terminated polyester urethane with the polysiloxane.

59. A substrate, preferably an aircraft, spacecraft, marine craft or vehicle part comprising a polyurethane-polysiloxane hybrid polymer coating composition of Clause 54 or Clause 55.

60. A substrate according to Clause 59, which is an aircraft part, preferably an aircraft transparency, more preferably an aircraft window or windscreen.

61. A process for preparing a substrate according to Clause 59 or Clause 60, comprising applying a polyurethane-polysiloxane hybrid coating composition precursor as defined in any of Clauses 50 to 53 to a surface of a substrate, removing at least a portion of the solvent, and preferably at least 80 wt %, at least 90 wt %, at least 95 wt %, or at least 98 wt %, of the solvent, from the polyurethane-polysiloxane hybrid coating composition precursor, preferably by air drying, and thermally curing the coating composition precursor to provide a substrate coated with a polyurethane-polysiloxane hybrid coating composition.

62. A process according to Clause 61 wherein the substrate is an aircraft transparency, preferably an aircraft window or windshield, and wherein the surface of the substrate comprises an electrically conductive layer, preferably wherein the conductive layer is an indium tin oxide layer or a carbon nanotube layer, and optionally a silicon binder layer over the conductive layer, onto which the polyurethane-polysiloxane hybrid coating composition precursor is applied.

63. A process according to Clause 61 or Clause 62, wherein the thermal curing comprises heating to a temperature of: about 50° C. to about 82° C., about 60° C. to about 82° C. or about 70° C. to about 82° C.

64. A substrate, preferably an aircraft transparency, and more preferably an aircraft window or an aircraft windshield, obtainable by the process of any of Clauses 61 to 63.

Although the invention has been described with certain detail through the preceding specific embodiments, this detail is for the primary purpose of illustration. Many variations and modifications can be made by one skilled in the art without departing from the spirit and scope of the invention as described in the following claims.

The invention claimed is:

1. A two-part curable coating composition comprising:

(A) a composition comprising an alkoxysilane terminated polyester urethane prepolymer, comprising a prepolymer chain having a terminal group of general formula (I):

(I)

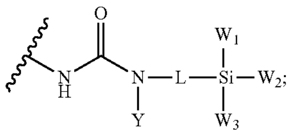

wherein:

Y is H, $R_1$, or the group:

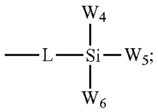

$R_1$ is hydrocarbyl;

L is a hydrocarbylene group;

$W_1$, $W_2$, $W_3$, $W_4$, $W_5$ and $W_6$ are the same or different and each, independently, are —$OR_2$, wherein $R_2$ at each occurrence is the same or different, and each $R_2$ is, independently, an alkyl group;

and (B) a composition comprising a silanol terminated polysiloxane prepolymer obtained by sol-gel process of an alkoxysilane that is a compound of general formula (II), (III) or (IV):

(II)

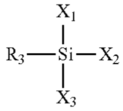

(III)

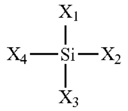

(IV)

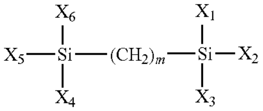

wherein:

$X_1$, $X_2$, $X_3$, $X_4$, $X_5$, and $X_6$ each are —$OR_3$;

$R_3$ at each occurrence is the same or different, and each is, independently, an alkyl group; and m is an integer from 1 to 6;

wherein the sol-gel process comprises reacting the alkoxysilane with at least one acid in the presence of a solvent comprising an alcohol and water.

2. The composition according to claim 1, wherein the compositions (A) and/or (B) include at least one or more of the following: solvent; urethane forming catalyst; antistatic agent; stabilizer that is one or more of a UV absorber, light stabilizer or thermal stabilizer; and surface active agent that is one or more of a flow or levelling agent or surfactant.

3. The composition according to claim 1, wherein $R_1$ at each occurrence is the same or different, and each is, independently, a $C_1$ to $C_6$ alkyl, or a $C_1$ to $C_4$ alkyl group.

4. The composition according to claim 1, wherein Y is H.

5. The composition according to claim 1, comprising at least one solvent.

6. The composition according to claim 1, comprising a urethane forming catalyst.

7. The composition according to claim 1, comprising a UV absorber, a light absorber and a thermal stabilizer.

8. The composition according to claim 1, comprising a stabilizer combination comprising: a UV absorber, a light absorber and a thermal stabilizer:

wherein the stabilizer combination comprises 6-methylheptyo 2 [4-[4,6-bis (4-phenylphenyl)-1H-1,3,5-triazin-2-ylidene]-3-oxocyclohexa-1,5-dien-1-yl]oxypropanoate, 2,4-bis [N-butyl-N-(1-cyclohexyloxy-2,2,6,6-tetramethylpiperidin-4-yl)amino]-6-(2-hydroxyethylamine)-1,3,5-triazine and pentaerythritol tetrakis(3-(3,5-di-tert-butyl-4-hydroxyphenyl)propionate); and/or wherein the total amount of stabilizers is about 0.5 wt % to about 4 wt %, based on the total weight of solids in the two part curable composition.

9. The composition according to claim 1, comprising an antistatic agent.

10. The composition according to claim 1, comprising a flow or levelling agent and/or a surfactant.

11. The composition according to claim 1, wherein the alkoxysilane-terminated polyester urethane prepolymer in composition (A) is obtained by a process comprising:

(i) reacting an aliphatic diisocyanate with a polyester diol to form an isocyanate-terminated polyester urethane prepolymer; and (ii) silanizing the isocyanate-terminated polyester urethane prepolymer with an amino-functional alkoxysilane to form the alkoxysilane-terminated polyester urethane prepolymer.

12. The composition according to claim 11, wherein the aliphatic diisocyanate in step (i) is a monomeric aliphatic diisocyanate, or a monomeric cycloaliphatic diisocyanate.

13. The composition according to claim 11, wherein the polyester diol is a polycaprolactone-based polyester diol.

14. The composition according to claim 11, wherein the molar ratio of the polyester diol to aliphatic diisocyanate in step (i) is from: about 1:1.1 to about 1:5.

15. The composition according to claim 11, wherein step (i) is carried out in the presence of a urethane forming catalyst, and/or at least one additive that is one or more stabilizers or a flow/leveling agent.

16. The composition according to claim 11, wherein step (i) is carried out at a temperature of about 50° C. to about 120° C., and/or wherein the reaction time in step (i) is about 1 to about 4 hours.

17. The composition according to claim 11, wherein step (i) further comprises adding an aprotic solvent to the isocyanate-terminated polyester urethane prepolymer to form a homogeneous mixture having a solid content of about 20 to about 80 wt %.

18. The composition according to claim 11, wherein the amino-functional alkoxysilane in step (ii) is an aminoalkyltrialkoxysilane, an aminoaryltrialkoxysilane, an aminoalkyl (alkyl)(dialkoxyl)silane, a [bis(trialkoxylsilyl)-alkyl]amine, an N-(aminoalkyl)-aminoalkyltrialkoxysilane, or an N-alkyltrialkoxylsilyl-N, N-dialkylamine.

19. The composition according to claim 11, wherein step (ii) comprises adding the amino-functional alkoxysilane to the isocyanate-terminated polyester urethane prepolymer; and/or wherein step (ii) is conducted in the presence of at least one aprotic solvent, and optionally additionally in the presence of a protic solvent in which the isocyanate-terminated polyester urethane prepolymer and the amino-functional alkoxysilane are soluble.

20. The composition according to claim 11, wherein step (ii) further comprises adding at least one surfactant to the alkoxysilane-terminated polyester urethane prepolymer.

21. The composition according to claim 1, wherein the alkoxysilane is an alkyltrioxysilane, an alkylorthosilicate or a bis(trialkyloxysilyl)alkane.

22. The composition according to claim 21, wherein the process comprises adding the alkoxysilane to a mixture comprising the at least one acid, water and an alcohol.

23. The composition according to claim 21, wherein the acid comprises a carboxylic acid and/or a mineral acid.

24. The composition according to claim 21, wherein the acid is present in an amount to maintain a pH in the range of about 1.5 to about 5.

25. The composition according to claim 11, wherein the molar ratio of the amino-functional alkoxysilane in step (ii) to the alkoxysilane in composition (B) is about 1:4 to about 4:1.

26. The composition according to claim 1, which is thermally curable.

27. A polyurethane-polysiloxane hybrid coating composition (PUPSHCC) precursor which is obtained by a process comprising compounding composition (A) and composition (B) of the two-part curable composition of claim 1.

28. The polyurethane-polysiloxane hybrid coating composition precursor according to claim 27, having a solids content of about 10 wt % to about 50 wt %.

29. A polyurethane-polysiloxane hybrid coating composition which is obtained by a process comprising removing at least a portion of solvent from the polyurethane-polysiloxane hybrid coating composition precursor of claim 27 and subjecting the PUPSHCC precursor to thermal curing.

30. A process for preparing the two-part curable coating composition of claim 1, comprising:

(1) preparing the composition (A) comprising the alkoxysilane-terminated polyester urethane prepolymer by a process comprising: (i) reacting an aliphatic diisocyanate with a polyester diol to form an isocyanate-terminated polyester urethane prepolymer; and (ii) silanization of the isocyanate-terminated polyester urethane prepolymer with an amino-alkoxysilane; and (2) preparing the composition (B) comprising the silanol terminated polysiloxane prepolymer by the sol-gel process comprising reacting the alkoxysilane with the at least one acid, in the presence of the solvent comprising the alcohol and water.

31. A method comprising coating a substrate with the composition according to claim 1.

32. A substrate comprising the polyurethane-polysiloxane hybrid polymer coating composition of claim 29.

33. A process for preparing the substrate according to claim 32, comprising applying the polyurethane-polysiloxane hybrid coating composition precursor of claim 27 to a surface of a substrate, removing at least a portion of the solvent, from the polyurethane-polysiloxane hybrid coating composition precursor, and thermally curing the coating composition precursor to provide a substrate coated with the polyurethane-polysiloxane hybrid coating composition, and wherein the surface of the substrate comprises an electrically conductive layer, onto which the polyurethane-polysiloxane hybrid coating composition precursor is applied.

34. The composition according to claim 5, wherein the solvent comprises an aprotic solvent and a protic solvent, wherein the aprotic solvent is ethyl 3-ethoxypropionate, n-pentyl propionate, 2-butoxyethyl acetate, di-isobutyl ketone, or methyl isobutyl ketone, or a combination thereof; and/or the protic solvent is a hydroxyketone.

35. The composition according to claim 6, wherein the urethane forming catalyst is dibutyltin dilaurate or dibutyltin diacetate; and/or wherein the urethane forming catalyst is present in an amount of about 0.1 ppm to about 100 ppm, based on the total weight of solids in the composition.

* * * * *